(12) United States Patent
Kaneda

(10) Patent No.: US 7,995,437 B2
(45) Date of Patent: Aug. 9, 2011

(54) OPTICAL PICK UP AND OPTICAL DISC APPARATUS

(75) Inventor: Kazumasa Kaneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 8 days.

(21) Appl. No.: 12/634,953

(22) Filed: Dec. 10, 2009

(65) Prior Publication Data

US 2010/0149955 A1    Jun. 17, 2010

(30) Foreign Application Priority Data

Dec. 12, 2008   (JP) .................................. 2008-317114

(51) Int. Cl.
*G11B 7/00*   (2006.01)

(52) U.S. Cl. ............... 369/53.19; 369/44.32; 369/44.25; 369/44.41

(58) Field of Classification Search .................. None
See application file for complete search history.

(56) References Cited

U.S. PATENT DOCUMENTS

| 7,843,774 B2 * | 11/2010 | Nagura | 369/44.23 |
| 2004/0057353 A1 * | 3/2004 | Ohno et al. | 369/44.32 |

FOREIGN PATENT DOCUMENTS

| JP | 2005-209283 A | 8/2005 |
| JP | 2005-293746 A | 10/2005 |
| JP | 2007-294023 A | 11/2007 |
| JP | 2007-328886 A | 12/2007 |
| JP | 2008-112575 | 5/2008 |
| JP | 2008-234803 A | 10/2008 |
| JP | 2009-211775 A | 9/2009 |
| JP | 2010-123213 A | 6/2010 |
| JP | 2010-153015 A | 7/2010 |
| WO | WO 2007/138924 A1 | 12/2007 |

* cited by examiner

*Primary Examiner* — Muhammad N Edun
(74) *Attorney, Agent, or Firm* — Wolf, Greenfield & Sacks, P.C.

(57) ABSTRACT

An optical pickup includes: a light source emitting a beam having a predetermined wavelength; a plastic objective lens condensing the emitted beam on an optical disc; a light detector receiving and detecting the beam reflected by the optical disc; an objective-lens driving unit driving the objective lens in the tilt direction to tilt the objective lens; and a tilt-sensitivity sensing unit sensing a tilt sensitivity denoted by $\Delta W_{LT}/\Delta \theta$, where $\Delta W_{LT}$ [λrms] is a coma aberration amount $\Delta \theta$ [deg] is a tilt amount at the time of tilting the objective lens, wherein, in the case where the sensed tilt sensitivity is equal to or larger than a predetermined value, tilt is corrected by tilting the objective lens so that signal quality detected by the light detector is improved, and in the case where the sensed tilt sensitivity is smaller than the predetermined value, tilt is not corrected.

9 Claims, 14 Drawing Sheets

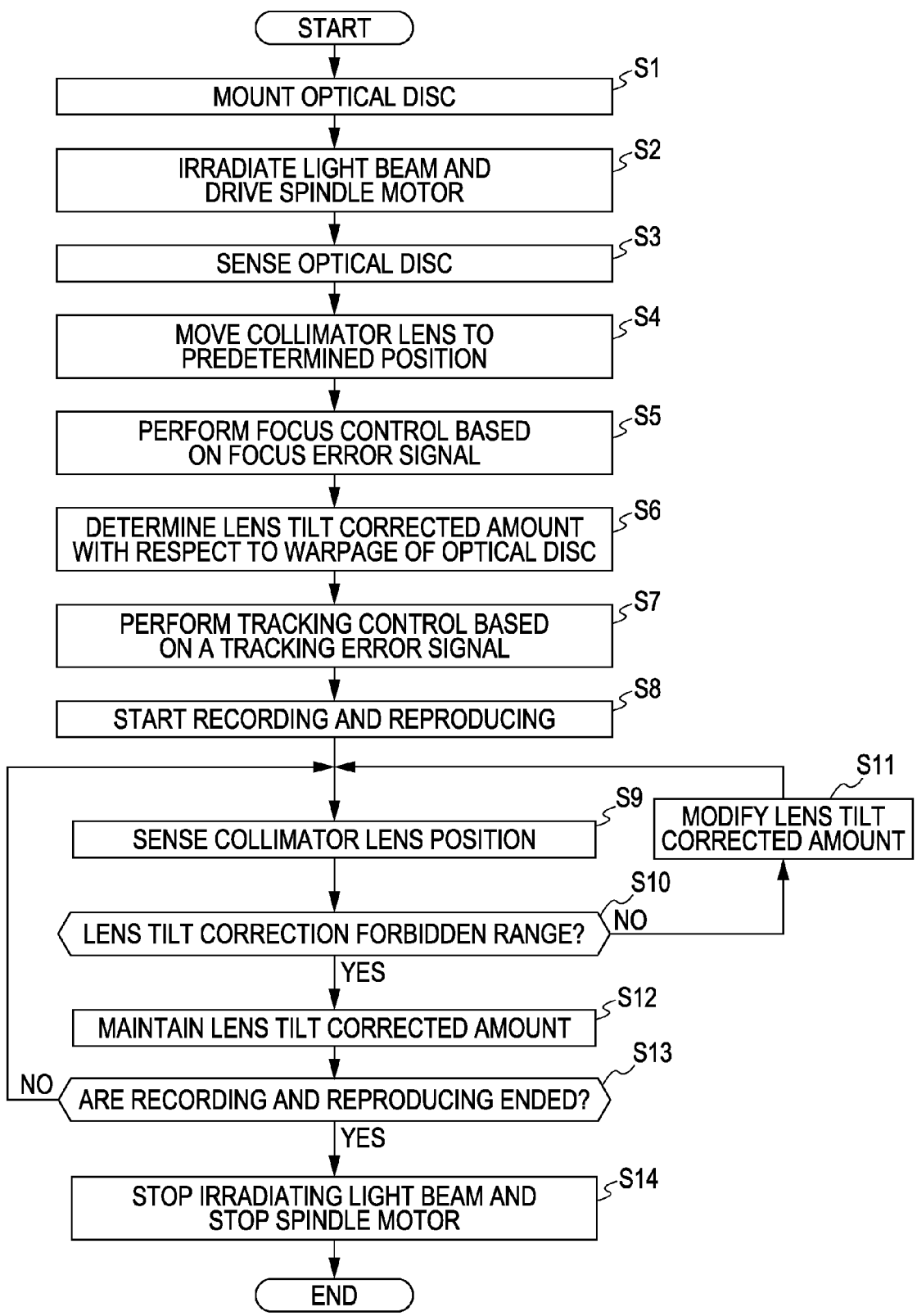

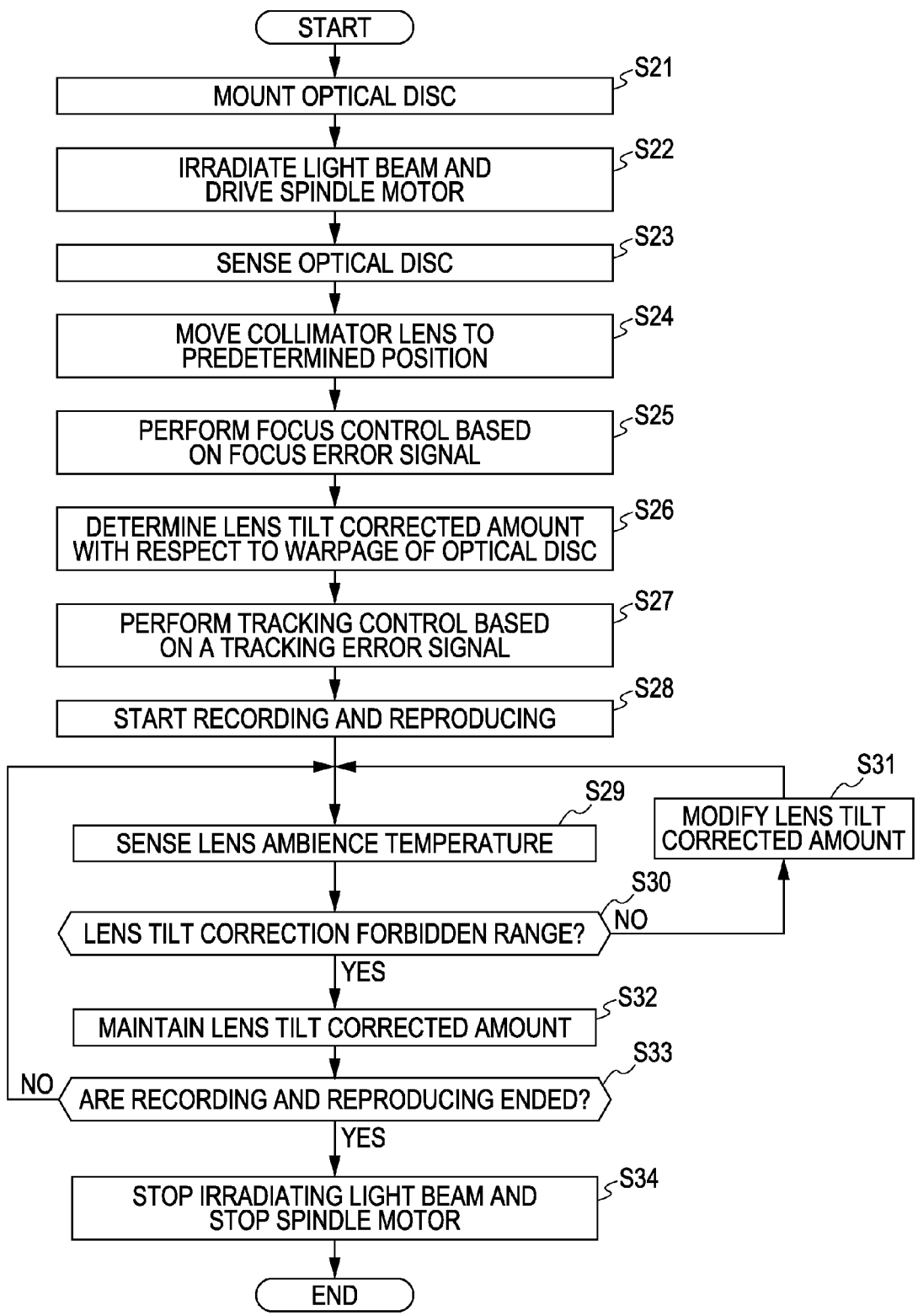

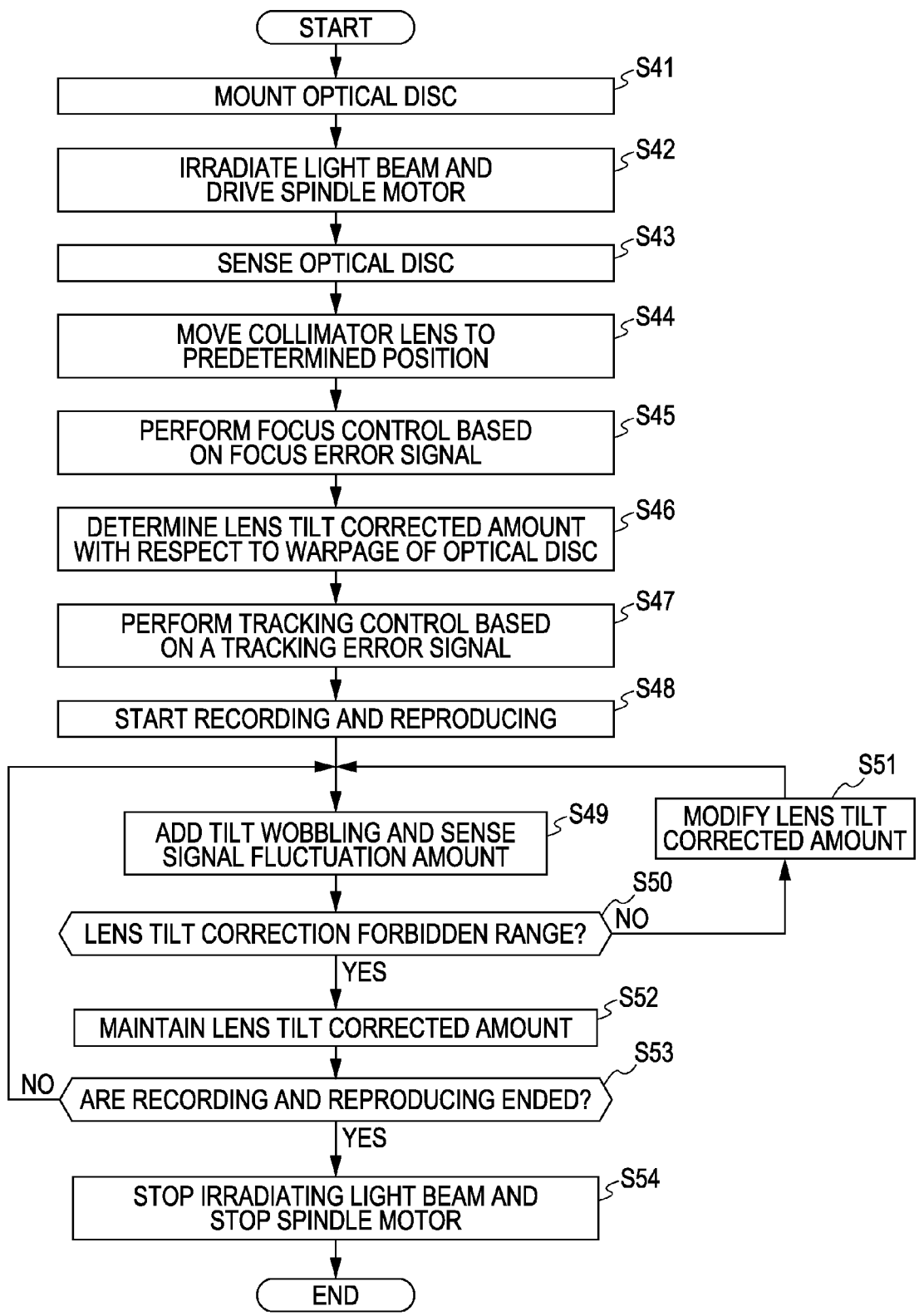

OPTICAL PICK UP AND OPTICAL DISC APPARATUS

BACKGROUND OF THE PRESENT INVENTION

1. Field of the Present Invention

The present invention relates to an objective lens used for an optical pickup and an optical disc apparatus that performs recording and/or reproducing information on an optical recording medium such as an optical disc and an optical pickup and an optical disc apparatus using the objective lens.

2. Description of the Related Art

In the related art, as a recording medium for information signals, there have been optical discs such as a CD (Compact Disc) using a light beam having a wavelength of about 785 nm and a DVD (Digital Versatile Disc) using a light beam having a wavelength of about 660 nm, capable of implementing recording with a higher density than that of the CD. In addition, as the optical disc, there has been a high density recordable optical disc (hereinafter, referred to as a "high density recording optical disc") which performs recording and reproducing signals using a light beam having a wavelength of about 405 nm emitted from a blue violet semiconductor laser, capable of implementing recording with a higher density than that of the DVD. As the high density recording optical disc, there has been proposed a structure such as BD (Blu-ray Disc (Registered Trade Mark)), in which a cover layer (protective layer) for protecting a recording layer, on which signals are recorded, is configured to have a small thickness.

An optical pickup has been used to perform recording information signals on the aforementioned optical disc such as a CD, a DVD, and a BD and to perform reproducing the information signals recorded on the optical disc. The optical pickup includes a light source that emits a light beam, an objective lens that condenses the light source emitted from the light source on the recording layer of the optical disc, a fixed optic system that guides the light beam from the light source to the objective lens, and the like.

In the optical pickup in the related art, at the time of assembling and adjusting the objective lens that condenses the light beam on the recording layer of the optical disc, the objective lens may be arranged to be tilted with respect to an ideal optical disc (hereinafter, referred to as a "reference disc") having no warpage, which is used as a reference. In other words, at the time of assembling and adjusting, an optical axis of the light beam that is guided from the fixed optic system to the objective lens may be arranged to be tilted with respect to an optical axis of the objective lens. In this manner, the objective lens is assembled to be tilted, so that a coma aberration of the objective lens and a coma aberration caused by other parts of the optical pickup, which are included in the fixed optic system and the like, can be cancelled to be reduced. This process has been generally used so as to reduce the coma aberrations. In addition, in the case of reducing the aforementioned coma aberration, the objective lens is disposed to be tilted.

It has been known that the coma aberration caused by a relative slope between the objective lens and the optical disc is proportional to the cube of numerical aperture (NA) of the objective lens and the cover layer thickness and proportional to the reciprocal of wavelength. Therefore, in the case of an optical pickup for a BD in which a high NA and a short wavelength is combined, the problem of coma aberration may easily occur. In order to solve the problem, the aforementioned lens adjusting method has been generally used.

In order to improve mass-productivity and to implement light weight, the objective lens for the optical pickup is preferably made of a plastic (synthetic resin) as a substitute for a glass that has been widely used in the related art. Recently, a plastic having an excellent light resistance to a blue laser has been developed. Therefore, a plastic objective lens has been considered to be employed. In general, since a glass objective lens has a small change in refractive index according to a change in temperature, a spherical aberration amount of an optic system caused by the change in temperature is small, so that behaviors due to the change in temperature have no problem.

However, since a plastic lens generally used is greatly influenced by the change in temperature, a ratio of deformation or change in refractive index is larger than that of a glass lens. On the other hand, since the optical pickup is used under various environments, the optical pickup is necessary to normally operate in a predetermined temperature range. Due to the change in refractive index associated with the change in environment temperature, the spherical aberration occurs. Therefore, the change in spherical aberration caused by the change in refractive index, where has no problem in the optical pickup apparatus in the related art, is not a negligible amount in the configuration of combining a laser having a short wavelength and an objective lens having a high NA.

The changing spherical aberration caused by the change in refractive index can be cancelled to be reduced by driving a collimator lens included in an optical pickup optic system in the optical axial direction. However, if the collimator lens is moved so as to reduce the spherical aberration, the problem of a change in incidence magnification of the light beam to the objective lens occurs. In other words, the incidence magnification of the light beam to the objective lens is greatly changed substantially in proportion to an amount of the changing spherical aberration.

Herein, if the incidence magnification to the objective lens is changed, a deviation from an aplanatic design occurs, and the amount of the coma aberration caused by the tilting of the objective lens is changed. Hereinafter, in the case where the coma aberration amount $\Delta W_{LT}$ [λrms] occurs at the time of tilting the objective lens by $\Delta\theta$ [deg] (hereinafter, referred to as a "lens tilt"), a sensitivity defined by $\Delta W_{LT}/\Delta\theta$ is referred to as a "lens tilt sensitivity". In addition, the incidence magnifications causing the optimum spherical aberration are different between the high and low environment temperature cases, so that the lens tilt sensitivities are different between the high and low temperature cases.

As described above, in the case where the objective lens is adjusted to be fixed in the tilt direction, the coma aberration at the temperature such as the room temperature at the time of adjusting is reduced. In the case where the lens tilt sensitivity is changed due to the change in environment temperature in the state, there is a problem in that the coma aberration amount that is to be corrected at the time of adjusting is different from the coma aberration amount that really occurs due to the tilting of the objective lens. In other words, the lens tilt sensitivity is different due to the change in environment temperature, so that the real tilt angle is different from the optimum adjusting angle. Therefore, there is a problem in that the coma aberration occurs to the extent that the coma aberration influences the quality of signal. In addition, the behavior of the change in lens tilt sensitivity is different between the high and low temperature in the change in environment temperature, so that the lens tilt sensitivity may be very low. In this case, there is a problem in that the coma aberration caused by the change in temperature or the coma aberration caused by the warpage of the optical disc may not be cancelled by the lens tilt. In addition, there is a problem in that the aforementioned coma aberration has an adverse influence on a quality of signal.

Japanese Unexamined Patent Application Publication No. 2008-112575 is an example of related art.

SUMMARY OF THE INVENTION

It is desirable to provide an optical pickup and an optical disc apparatus capable of improving mass productively and implementing light weight by constructing an objective lens included in an optical pickup with a plastic and capable of implementing good recording and reproducing characteristics by suitably reducing a coma aberration even in the case where an environment temperature is changed.

According to an embodiment of the present invention, there is provided an optical pickup, including: a light source that emits a light beam having a predetermined wavelength; a plastic objective lens that condenses the light beam emitted from the light source on an optical disc; a light detector that receives the light beam reflected by the optical disc and detects the light beam; an objective lens driving unit that drives the objective lens in the tilt direction to tilt the objective lens; and a lens tilt sensitivity sensing unit that senses a lens tilt sensitivity that is denoted by $\Delta W_{LT}/\Delta \theta$, in which $\Delta W_{LT}$ [λrms] is a coma aberration amount occurring at the time of tilting the objective lens and $\Delta \theta$ [deg] is a lens tilt amount at that time, wherein, in the case where the lens tilt sensitivity sensed by the lens tilt sensitivity sensing unit is equal to or larger than a predetermined value, lens tilt correction is performed by tilting the objective lens so that a quality of a signal detected by the light detector is improved, and in the case where the lens tilt sensitivity sensed by the lens tilt sensitivity sensing unit is smaller than the predetermined value, the lens tilt correction is not performed.

According to another embodiment of the present invention, there is provided an optical disc apparatus having an optical pickup that records and/or reproduces information signals by irradiating a light beam on an optical disc that is driven to rotate, and the aforementioned optical pickup is used for the optical disc apparatus.

According to an embodiment of the present invention, the objective lens is made of a plastic, so that improved mass productivity and light weight can be implemented. In addition, the configuration is made by taking into consideration the change in the lens tilt sensitivity, so that the compensation of the coma aberration can be performed even in the case where the environment temperature is changed. In other words, according to an embodiment of the present invention, mass productivity and light weight can be implemented, and good recording and reproducing characteristics can be implemented by performing good aberration correction.

BRIEF DESCRIPTION OF THE DRAWINGS

FIG. 10 is a diagram for explaining an assembling angle of an objective lens.

FIG. 16 is a flowchart showing a procedure of performing tilt adjusting by detecting a position of a collimator lens as a first example of a tilt adjusting method using an optical pickup according to an embodiment of the present invention;

FIG. 17 is a flowchart showing a procedure of performing tilt adjusting by detecting a circumferential temperature of a lens as a second example of a tilt adjusting method using an optical pickup according to an embodiment of the present invention;

FIG. 18 is a flowchart showing a procedure of performing tilt adjusting by detecting a changing signal amount at the time of tilt wobbling as a third example of a tilt adjusting method using an optical pickup according to an embodiment of the present invention; and FIG. 19 is a diagram for explaining a changing signal amount at the time of lens tilt wobbling by comparing a case where a tilt sensitivity exists with a case where the tilt sensitivity does not exist.

DESCRIPTION OF THE PREFERRED EMBODIMENTS

Hereinafter, embodiments will be described in the following order.
1. Entire Configuration of Optical Disk Apparatus
2. Entire Configuration of Optical Pickup
3. Lens Tilt Sensitivity of Objective Lens
4. Lens Tilt Correction Process
5. Lens Tilt Correction Process of Two-Layer and Multi-Layer Optical Discs
6. Tilt Correction Process (First Example)
7. Tilt Correction Process (Second Example)
8. Tilt Correction Process (Third Example)

1. Entire Configuration of Optical Disk Apparatus

Hereinafter, an optical disc apparatus according to an embodiment of the present invention is described with reference to the drawings.

Figure 1:
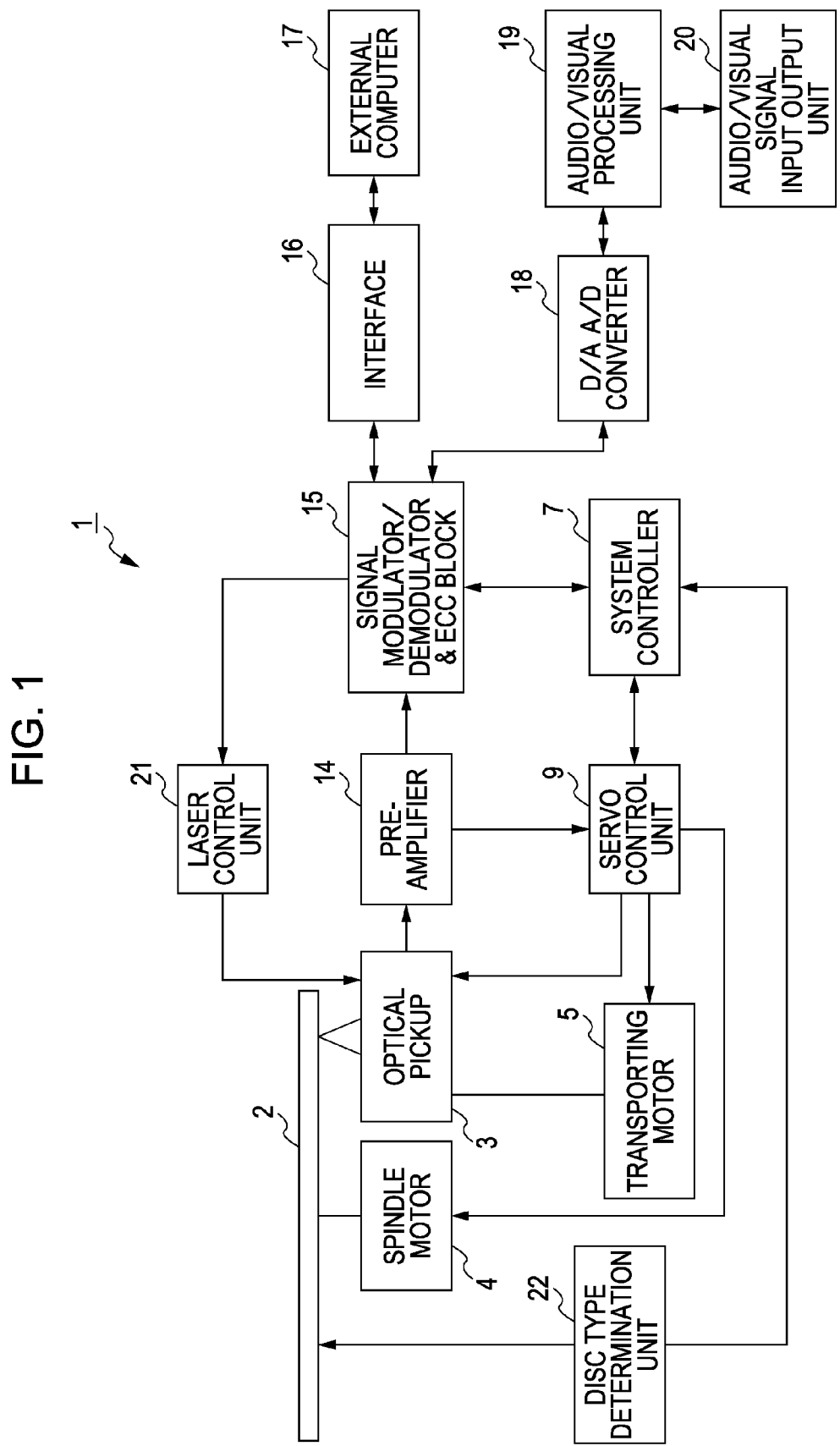
FIG. 1 is a block circuit diagram showing an optical disc apparatus according to an embodiment of the present invention.

As shown in FIG. 1, the optical disc apparatus 1 according to an embodiment of the present invention includes an optical pickup 3 that performs recording and reproducing information from an optical disc 2 and a spindle motor 4 that is a rotation driving unit for rotating the optical disc 2. The optical disc apparatus 1 further includes a transporting motor 5 that moves the optical pickup 3 in a radial direction of the optical disc 2. The optical disc apparatus 1 is an optical disc apparatus having a three-standard compatibility, which can performs recording or reproducing signal information with respect to three types of optical discs having different formats and optical discs on which recording layers are laminated.

The optical disc 2 used herein is a high density recording type first optical disc 11 such as a high density recordable BD (Blu-ray Disc (registered trade mark) using, for example, semiconductor laser having a short emission wavelength of about 405 nm (blue violet) as a light source. The first optical disc 11 has a cover layer having a thickness of about 100 µm. The first optical disc 11 is irradiated with a light beam having a wavelength of about 405 nm from the cover layer side. In addition, as an example of the first optical disc, there are a single-layer optical disc (a thickness of the cover layer: 100 µm) having a single recording layer and a two-layer optical disc having two recording layers. Moreover, the first optical disc may have multiple recording layers. In the two-layer optical disc, a thickness of a cover layer of a recording layer L0 is about 100 µm, and a thickness of a cover layer of a recording layer L1 is about 75 µm.

In addition, the optical disc 2 used herein is a second optical disc 12 such as a DVD (Digital Versatile Disc), a DVD-R (Recordable), a DVD-RW (ReWritable), and a DVD+RW (ReWritable) using, for example, a semiconductor laser having an emission wavelength of about 655 nm as a light source. The second optical disc 12 has a cover layer having a thickness of about 0.6 mm. The second optical disc 12 is irradiated with a light beam having a wavelength of about 655 nm from the cover layer side. In addition, the second optical disc 12 also has multiple recording layers.

In addition, the optical disc 2 used herein is a third optical disc 13 such as a CD (Compact Disc), a CD-R (Recordable), and a CD-RW (ReWritable) using, for example, a semiconductor laser having an emission wavelength of about 785 nm as a light source. The third optical disc 13 has a cover layer having a thickness of about 1.2 mm. The third optical disc 13 is irradiated with a light beam having a wavelength of about 785 nm.

In addition, hereinafter, in the case where the first to third optical discs 11, 12, and 13 are not particularly distinguished, these optical discs are referred as the optical disc 2.

In the optical disc apparatus 1, the spindle motor 4 and the transporting motor 5 are controlled to be driven by a servo control unit 9 according to the type of the disc. Therefore, the spindle motor 4 drives, for example, the first optical disc 11, the second optical disc 12, and the third optical disc 13 with predetermined rotation numbers.

The optical pickup 3 is an optical pickup having a three-wavelength compatible optic system. The optical pickup 3 irradiates light beams having different wavelengths on the recording layers of the optical discs having different standards and detects reflecting lights of the light beam from the recording layers.

The optical disc apparatus 1 includes a pre-amplifier 14 that generates a focus error signal, a tracking error signal, an RF signal, and the like based on signals output from the optical pickup 3. In addition, the optical disc apparatus 1 includes a signal modulator demodulator and error correction code block (hereinafter, referred to as a signal modulator demodulator & ECC block) 15 that demodulates signals from the pre-amplifier 14 or modulates signals from an external computer 17 or the like. In addition, the optical disc apparatus 1 includes an interface 16, D/A A/D converter 18, an audio/visual processing unit 19, and an audio/visual signal input output unit 20.

The pre-amplifier 14 generates the focus error signal based on outputs of a light detector by using an astigmatic method or the like, and generates the tracking error signal by using a three-beam method, a DPD method, a DPP method, and the like. In addition, the pre-amplifier 14 further generates the RF signal and outputs the RF signal to the signal modulator demodulator & ECC block 15. In addition, the pre-amplifier 14 outputs the focus error signal and the tracking error signal to the servo control unit 9.

When data recording is performed on the first optical disc 11, the signal modulator demodulator & ECC block 15 performs the following processes on digital signals input from the interface 16 or the D/A A/D converter 18. More specifically, when the data recording is performed on the first optical disc 11, the signal modulator demodulator & ECC block 15 performs an error correction process on the input digital signals by using an error correction scheme such as LDC-ECC, BIS, and the like. Next, the signal modulator demodulator & ECC block 15 performs a modulation process by using a 1-7 PP scheme or the like. In addition, when recording data on the second optical disc 12, the signal modulator demodulator & ECC block 15 performs the error correction process according to the error correction scheme such as PC (product Code). Next, the signal modulator demodulator & ECC block 15 performs a modulation process such as an 8-16 modulation process. In addition, when recording data on the third optical disc 13, the signal modulator demodulator & ECC block 15 performs the error correction process according to the error correction scheme such as CIRC. Next, the signal modulator demodulator & ECC block 15 performs a modulation process such as 8-14 modulation process. Next, the signal modulator demodulator & ECC block 15 outputs the modulated data to the laser control unit 21. In addition, when performing reproduction of each optical disc, the signal modulator demodulator & ECC block 15 performs a demodulation process corresponding to the modulation scheme based on the RF signal input from the pre-amplifier 14. In addition, the signal modulator demodulator & ECC block 15 performs the error correction process and outputs the data to the interface 16 or the D/A A/D converter 18.

In addition, in the case where the data are compressed to be recorded, a compression decompression unit may be disposed between the signal modulator demodulator & ECC block 15 and the interface 16 or the D/A A/D converter 18. In this case, the data are compressed according to a scheme such as MPEG2 or MPEG4.

A focus error signal or a tracking error signal from the pre-amplifier 14 is input to the servo control unit 9. The servo control unit 9 generates a focus servo signal or a tracking servo signal so that the focus error signal or the tracking error signal becomes 0. The servo control unit 9 controls driving an objective lens driving unit such as a three-axis actuator for driving the objective lens based on the servo signal. The servo control unit 9 detects a synchronization signal or the like from the output of the pre-amplifier 14 and controls the spindle motor according to a CLV (Constant Linear Velocity) scheme, a CAV (Constant Angular Velocity) scheme, or a combination thereof.

The laser control unit 21 controls a laser light source of the optical pickup 3. Particularly, in a specific example, the laser control unit 21 performs the control so that an output power of the laser light source of the light emitting unit is different between a time of recording mode and a time of reproducing mode. In addition, the laser control unit 21 also performs the control so that the output power of the laser light source is different according to the type of the optical disc 2. The laser control unit 21 replaces the laser light source of the optical pickup 3 according to the type of the optical disc 2 detected by the disc type determination unit 22.

The disc type determination unit 22 detects different formats of the optical disc 2 by detecting a difference in surface reflectance or a difference in shape or outer appearance among the first to third optical disc 11, 12, and 13.

Each of the blocks constituting the optical disc apparatus 1 is configured to perform signal processing based on the specifications of the mounted optical disc 2 according to the detection result of the disc type determination unit 22.

The system controller 7 controls the entire apparatus according to the type of the optical disc determined by the disc type determination unit 22. In addition, the system controller 7 controls each of components according to the user's manipulation input based on address information or list information (Table of Contents; TOC) recorded in premastered pits or grooves in the innermost circumference of the optical disc. In other words, the system controller 7 specifies the recording position or the reproducing position of the optical disc on which the recording or the reproducing is performed based on the aforementioned information and controls each of the components based on the specified position.

In the optical disc apparatus 1 having the above configuration, the optical disc 2 is operated to be rotated by the spindle motor 4. Next, the optical disc apparatus 1 controls driving the transporting motor 5 according to the control signal from the servo control unit 9 so as for the optical pickup 3 to be moved to a position corresponding to a desired recording track of the optical disc 2, so that information signals are recorded or reproduced with respect to the optical disc 2.

More specifically, in the case where the recording or the reproducing is performed by the optical disc apparatus 1, the servo control unit 9 rotates the optical disc 2 according to a CAV scheme, a CLV scheme, or a combination thereof. The optical pickup 3 irradiates the light beam from the light source, detects the light beam returning from the optical disc 2 by using the light detector, and generates the focus error signal or the tracking error signal. In addition, the optical pickup 3 performs the focus servo and the tracking servo by driving the objective lens by using the objective lens driving unit based on the focus error signal or the tracking error signal.

In addition, at the time that the recording is to be performed by the optical disc apparatus 1, signals from the external computer 17 are input through the interface 16 to the signal modulator demodulator & ECC block 15. The signal modulator demodulator & ECC block 15 adds the aforementioned predetermined error correction code to the digital data input from the interface 16 or the A/D converter 18, performs a predetermined modulation process, and after that, generates a recording signal. The laser control unit 21 controls the laser light source of the optical pickup 3 to perform the recording on a predetermined optical disc based on the recording signal generated by the signal modulator demodulator & ECC block 15.

In addition, at the time that the information recorded on the optical disc 2 is to be reproduced by the optical disc apparatus 1, the signal modulator demodulator & ECC block 15 performs the demodulation process on the signal detected by the light detector. If the recording signal demodulated by the signal modulator demodulator & ECC block 15 is for data storage of the computer, the recording signal is output through the interface 16 to the external computer 17. Therefore, the external computer 17 can operates based on the signal recorded on the optical disc 2. If the recording signal demodulated by the signal modulator demodulator & ECC block 15 is for an audio/visual process, the recording signal is D/A-converted by the D/A converter 18 to be applied to the audio/visual processing unit 19. Next, the audio/visual processing unit 19 performs the audio/visual process on the recording signal and outputs an audio/visual signal through the audio/visual signal input output unit 20 to an external speaker or monitor (not shown).

2. Entire Configuration of Optical Pickup

Figure 2:
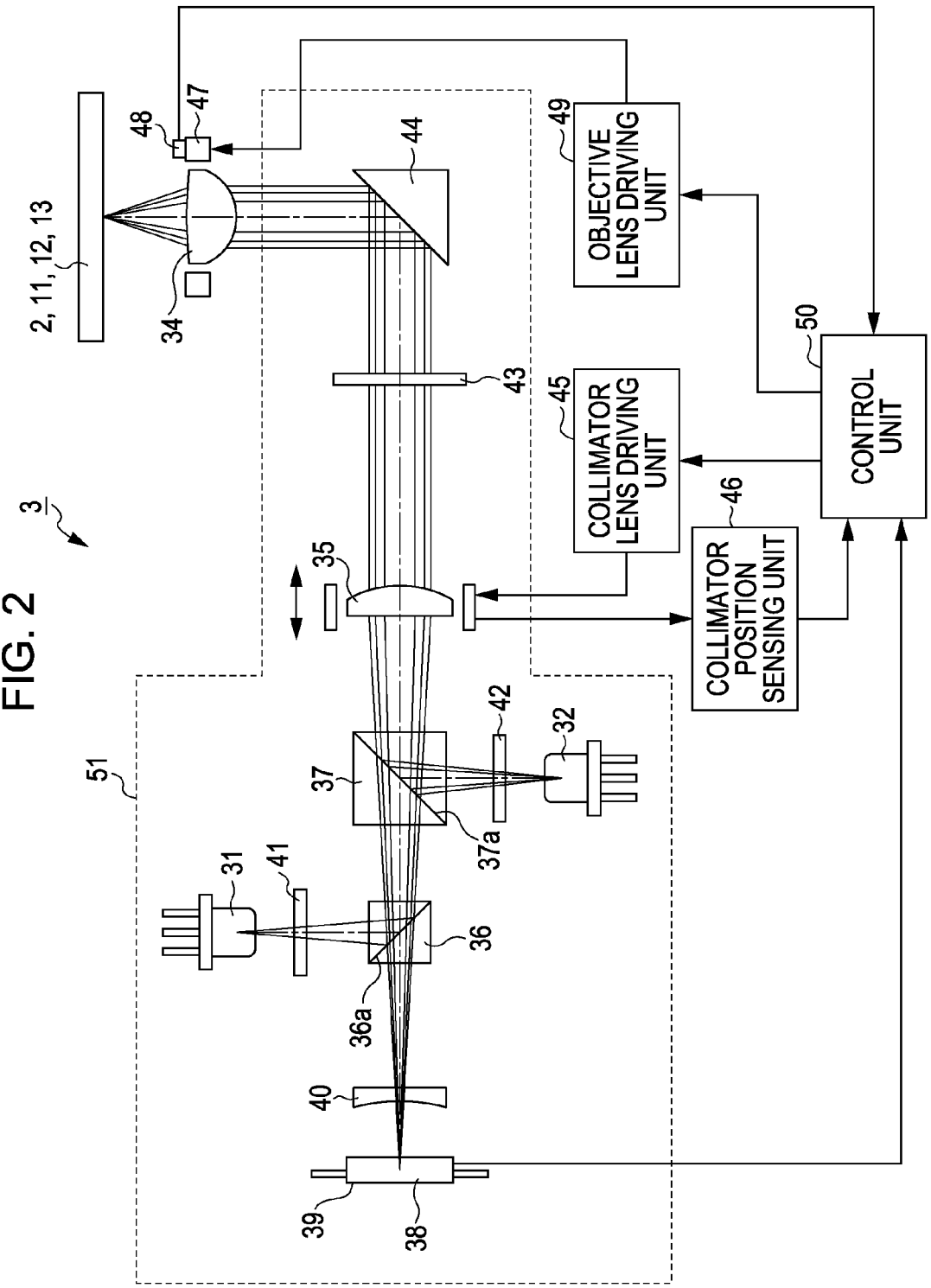
FIG. 2 is a diagram showing optical paths in an optic system of an optical pickup according to an embodiment of the present invention.

As shown in FIG. 2, the optical pickup 3 according to an embodiment of the present invention includes a first light source unit 31 having a first emitting portion that emits a light beam having a first wavelength. In addition, the optical pickup 3 includes a second light source unit 32 having a second emitting portion that emits a light beam having a second wavelength longer than the first wavelength and a third emitting portion that emits a light beam having a third wavelength longer than the second wavelength. In addition, optical pickup 3 includes an objective lens 34 as a condensing optic device that condenses the light beams emitted from the first to third emitting portions on a signal recording plane of the optical disc 2. In addition, the optical pickup 3 includes a collimator lens 35 that is disposed on an optical path between the first to third emitting portions and the objective lens 34 and can move in the optical axial direction. The collimator lens 35 functions as a dispersion angle conversion device that converts dispersion angles of the light beams having the first to third wavelengths so that the emitted light beams are adjusted into the substantially parallel light state or in the predetermined dispersion angle state.

In addition, the optical pickup 3 includes first and second beam splitters 36 and 37 functioning as an optical path separating unit. The first and second beam splitters 36 and 37 are the optical path separating unit that separates optical paths of returning light beams and optical paths of outward light beams emitted from the first to third emitting portions. Herein, the returning light beam denotes the returning light beams having the first to third wavelengths reflected from the signal recording plane among the light beams condensed on the signal recording plane of the optical disc 2 by the objective lens 34. In addition, the optical pickup 3 includes a light detector 39 having a common light receiving unit 38 that receives the backward (returning) light beams having the first to third wavelengths separated by the first and second beam splitters 36 and 37. In addition, the optical pickup 3 includes a multi-lens 40 that is disposed between the first beam splitter 36 and the light receiving unit 38. The multi-lens 40 functions as a coupling lens that condenses the returning light beams having the first to third wavelengths from the first beam splitter 36 on a light receiving plane of light receiving unit 38.

In addition, the optical pickup 3 includes a first grating 41 that is disposed between the first emitting portion of the first light source unit 31 and the first beam splitter 36. The first grating 41 has a function of diffracting the light beam having the first wavelength emitted from the first emitting portion into three beams in order to detect the tracking error signal or the like. In addition, the optical pickup 3 includes a second grating 42 that is disposed between the second and third emitting portions of the second light source unit 32 and the second beam splitter 37. The second grating 42 has a function of diffracting each of the light beams having the second and third wavelengths emitted from the second and third emitting portions into three beams in order to detect the tracking error signal or the like.

In addition, the optical pickup 3 includes a ¼ wavelength plate 43 that is disposed between the collimator lens 35 and the objective lens 34 to apply a phase difference corresponding to a ¼ wavelength to the incident light beams having the first to third wavelengths. In addition, the optical pickup 3 includes a start-up mirror 44 that is disposed between the objective lens 34 and the ¼ wavelength plate 43. The start-up mirror 44 reflects and starts up the light beam passing through the aforementioned optical parts in a plane perpendicular to the optical axis of the objective lens 34 and emits the light beam in the optical axial direction of the objective lens 34.

The first light source unit 31 includes the light emitting unit as the first emitting portion that is constructed with, for example, a semiconductor laser or the like and emits the light beam having the first wavelength, that is, a design wavelength of 405 nm corresponding to the first optical disc 11. The second light source unit 32 includes the second emitting portion that emits the light beam having the second wavelength, that is, a design wavelength of about 655 nm corresponding to the second optical disc 12. In addition, the second light source unit 32 includes the third emitting portion that emits the light beam having the third wavelength, that is, a design wavelength of about 785 nm corresponding to the third optical disc 13. In the second light source unit 32, the second and third emitting portions are disposed so that each of the emitting points is located in the same plane perpendicular to the optical axis of the light beams having the second and third wavelengths emitted from the second and third emitting portions. In addition, herein, the first emitting portion is disposed in the first light source unit 31, and the second and third emitting portions are disposed in the second light source unit 32. However, an embodiment of the present invention is not limited thereto, but the first to third emitting portions may be disposed in different light source units. In addition, the light source unit may be configured to have first to third emitting portions at substantially the same position.

The first grating 41 is disposed between the first light source unit 31 and the first beam splitter 36. The first grating 41 diffracts the light beam having the first wavelength emitted from the first emitting portion of the first light source unit 31 into three beams in order to detect the tracking error signal or the like and emits the three beams toward the first beam splitter 36.

The second grating 42 is disposed between the second light source unit 32 and the second beam splitter 37. The second grating 42 diffracts each of the light beams having the second and third wavelengths emitted from the second and third emitting portions of the second light source unit 32 into three beams in order to detect the tracking error signal or the like and emits the three beams toward the second beam splitter 37. The second grating 42 is the so-called two-wavelength grating having wavelength dependency and has a function of diffracting each of the light beams having the second and third wavelengths into predetermined three beams.

The first beam splitter 36 has a separating plane 36a having the following functions. The separating plane 36a has a function of reflecting the incident light beam having the first wavelength diffracted by the first grating 41 to be emitted toward the second beam splitter 37 and transmitting the returning light beams having the first to third wavelengths to be emitted toward the multi-lens 40. The separating plane 36a is formed to have wavelength dependency and polarization dependency so as to perform the aforementioned functions. Next, the first beam splitter 36 functions as an optical path separating unit that separates the optical path of the returning light beam having the first wavelength from the optical path of the outward light beam having the first wavelength emitted from the first emitting portion by using the separating plane 36a.

The second beam splitter 37 has a combining separating plane 37a having the following functions. The combining separating plane 37a transmits the outward light beam having the first wavelength from the first beam splitter 36 to be emitted toward the collimator lens 35. In addition, the combining separating plane 37a reflects the outward light beams having the second and third wavelengths from the second grating 42 to be emitted and guided toward the collimator lens 35. In addition, the combining separating plane 37a has a function of transmitting the returning light beams having the first to third wavelengths to be emitted toward the first beam splitter 36. The combining separating plane 37a is formed to have wavelength dependency and polarization dependency so as to perform the aforementioned functions. Next, the second beam splitter 37 functions as an optical path combining unit that combines the optical path of the outward light beam having the first wavelength with the optical path of the outward light beams having the second and third wavelengths to be guided toward the collimator lens 35 by using the combining separating plane 37a. In addition, the second beam splitter 37 functions as an optical path separating unit that separates the optical path the returning light beams having the second and third wavelengths from the optical path of the outward light beams having the second and third wavelengths emitted from the second and third emitting portions by using the combining separating plane 37a.

In addition, in the optical pickup 3, the first and second beam splitters 36 and 37 are configured to have a function as an optical path separating unit, and the second beam splitter 37 is configured to have a function as an optical path combining unit. However, an embodiment of the present invention is not limited thereto. In other words, the optical path combining unit that combines the outward optical paths of the light beams having the first to third wavelengths and the following optical path separating unit may be configured to be provided. The optical path separating unit may be configured to separate the backward optical paths of the light beams having first to third wavelengths from the outward optical paths of the light beams having the first to third wavelengths to be guided to the light receiving unit 38.

The collimator lens 35 is a dispersion angle conversion unit that is disposed between the second beam splitter 37 and the ¼ wavelength plate 43 to convert the dispersion angle of the passing light beam. The collimator lens 35 converts the dispersion angles of the incident light beams emitted from the light source units 31 and 32 into desired angles of the substantially parallel light or the like.

In addition, the collimator lens 35 is moved to convert the dispersion angle of the light beam incident to the objective lens 34 according to the position in order to correct the spherical aberration caused by, for example, an error in a cover layer thickness or a change in temperature. In other words, the collimator lens 35 can be moved in the optical axial direction, and the optical pickup 3 is provided with a collimator lens driving unit 45 that drives the collimator lens 35 to be moved in the optical axial direction. The collimator lens driving unit 45 may move the collimator lens 35, for example, by rotating a lead screw by using the transporting motor. In addition, similarly to the objective lens driving unit, the collimator lens driving unit 45 may move the collimator lens 35 by using an operation of a current flowing in a magnet and a coil. In addition, a linear motor or the like may be used. In addition, the collimator lens 35 is moved to allow the converging light in the state that the light is slightly converging from a parallel light or the dispersing light in the state that the light is slightly dispersed to be incident to the objective lens 34, so that the occurring spherical aberration is reduced. In addition, the optical pickup 3 may be provided with a collimator position detecting unit 46 such as a position sensor that detects the position of the collimator lens 35 moved by the collimator lens driving unit 45.

In addition, in the case where the optical pickup performs recording and reproducing information signals with respect to the optical disc in which a plurality of recording layers are formed, the collimator lens 35 is moved to the suitable position of each recording layer by detecting a change in surface reflectance through focus searching and by reading an identification signal. At this time, the collimator lens 35 is moved to the position of each recording layer to reduce the spherical aberration caused by a difference in a thickness (referred to as a "cover layer thickness") from each recording layer to a light incident surface of the optical disc. In other words, the collimator lens 35 and the collimator lens driving unit 45 can form a suitable beam spot of the light beam on each of the recording layers. In this manner, the collimator lens 35 is driven in the optical axial direction to change the incidence magnification of the light beam to the objective lens 34, so that the collimator lens 35 can reduce the spherical aberration caused by a change in temperature or a change in a cover layer thickness. Accordingly, the collimator lens 35 can form a suitable beam spot. Herein, the incidence magnification of light beam to the objective lens 34 is a magnification defined by S'/S. More specifically, S is a distance in the optical axial direction from an object point to an object-side main plane of the objective lens 34, and S' is a distance in the optical axial direction from an image-side main plane of the objective lens 34 to an imaging point.

In this manner, the collimator lens 35 and the collimator lens driving unit 45 functions as an incidence magnification changing unit that changes the incidence magnification of the light beam to the objective lens 34. Herein, the incidence magnification changing unit constituting the optical pickup 3 according to an embodiment of the present invention is not limited thereto, but a so-called beam expander or a LCD device may be used.

The ¼ wavelength plate 43 applies a phase corresponding to a ¼ wavelength to each of the outward light beams having the first to third wavelengths, of which dispersion angles is converted by the collimator lens 35, to emit circularly polarized light beams that are converted from linearly polarized light beams toward the start-up mirror 44. In addition, the ¼ wavelength plate 43 applies the phase corresponding to the ¼ wavelength to each of the returning light beams having the first to third wavelengths, which are guided from the start-up mirror 44, to emit the linearly polarized light beams that are converted from the circularly polarized light beams toward the collimator lens 35.

The start-up mirror 44 reflects the light beams, to which the phase difference corresponding to the ¼ wavelength by the ¼ wavelength plate 43 to be emitted toward the objective lens 34.

The objective lens 34 condenses each of the light beams having the first to third wavelengths, of which dispersion angles are converted by the collimator lens 35 and which are incident through the ¼ wavelength plate 43 and the start-up mirror 44, on the recording plane of the optical disc 2. An aperture stop is provided to the incidence side of the objective lens 34. The aperture stop performs aperture limitation so that the numerical aperture of the light beam incident to the objective lens 34 is to be a desired numerical aperture. More specifically, the aperture limitation is performed so that the numerical aperture for the first wavelength is to be the NA of, for example, about 0.85, so that the numerical aperture for the second wavelength is to be the NA of, for example, about 0.60, and so that the numerical aperture for the third wavelength is to be the NA of, for example, about 0.45. In addition, a diffracting unit or the like may be configured to be provided to an incidence plane or emission plane of the objective lens 34 so as to implement three-wavelength compatibility by a common objective lens.

The objective lens 34 is held by a lens holder 47, and the lens holder 47 is supported through a suspension to a fastening portion so that the lens holder 47 can be moved in the tracking direction or the focus direction. A temperature detecting device 48 is disposed to the lens holder 47 in the vicinity of the objective lens 34. The temperature detecting device 48 is a CMOS temperature sensor IC, a thermistor, or the like. An output voltage (temperature signal) of the temperature detecting device 48 is linearly changed according to a change in temperature. Therefore, the temperature detecting device 48 detects a temperature of the objective lens 34 or a circumferential temperature of the objective lens 34. In addition, since the temperature detecting device 48 is used to detect a change in spherical aberration caused by the change in temperature of the objective lens 34, if the temperature of the objective lens 34 or the circumferential temperature of the objective lens 34 can be detected, the installation position of the temperature detecting device 48 is not limited to the lens holder 47.

The objective lens 34 is movably held by the objective lens driving unit 49 provided to the optical pickup 3. The objective lens 34 is moved by the objective lens driving unit 49 based on the tracking error signal and the focus error signal that are generated from the returning light (from the optical disc 2) detected by the light detector 39. Therefore, the objective lens 34 is changed in two-axis directions, that is, in the direction (focus direction) of approaching to or departing from the optical disc 2 and the radial direction (tracking direction) of the optical disc 2. The objective lens 34 allows the light beam to converge so that the light beam from the first to third light emitting units converge into a focus on the recording plane of the optical disc 2 and allows the converging light beam to trace the recording track formed on the recording plane of the optical disc 2. In addition, the objective lens 34 can be tilted in the tilt direction of the objective lens 34 as well as in the aforementioned two-axis directions. The objective lens 34 is tilted in the tilt direction based on the RF signal or the like (detected by the light detector 39) by the objective lens driving unit 49. In this manner, the objective lens driving unit 49 is the so-called three-axis actuator that drives the objective lens 34 in the focus direction, the tracking direction, and the tilt direction. The objective lens 34 is tilted in the tilt direction so that the coma aberration can be reduced.

Figure 3:
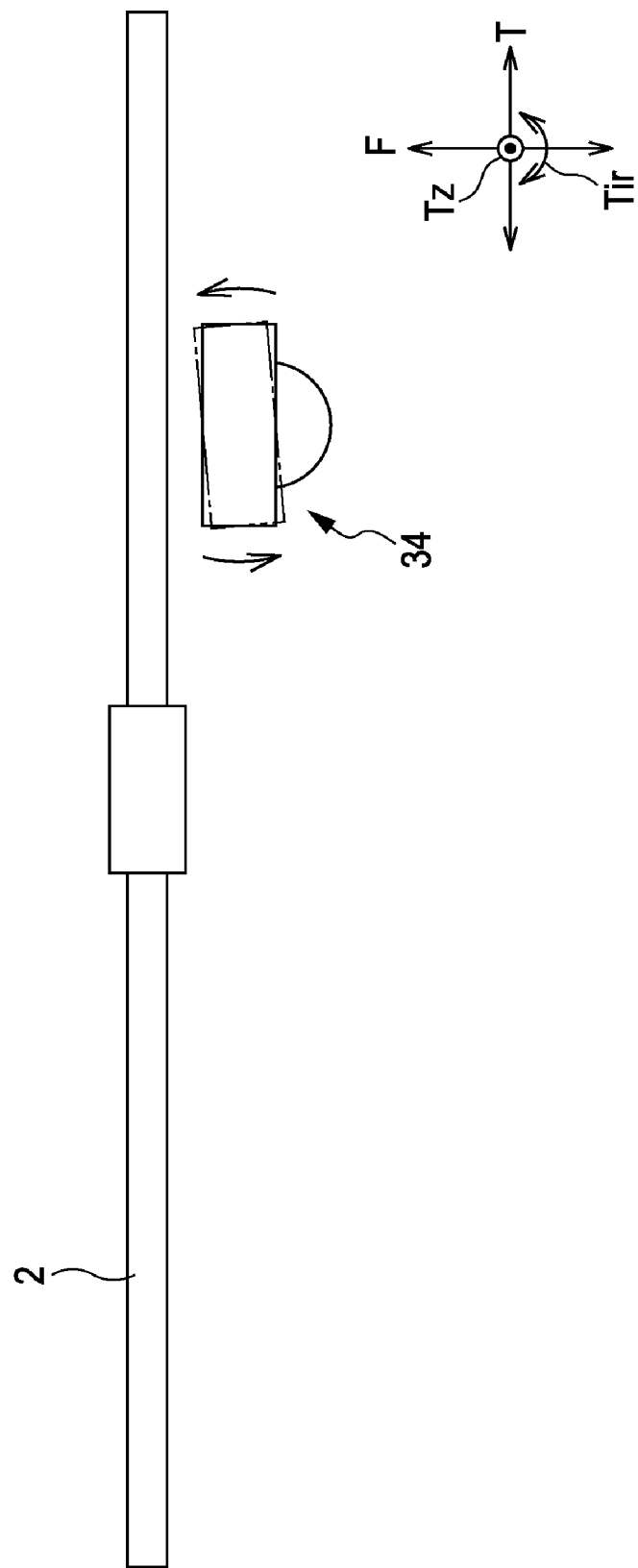
FIG. 3 is a diagram for explaining three axial directions in which an objective lens constituting an optical pickup is driven and manipulated and a diagrammatic view showing a relationship between the objective lens and an optical disc.

Herein, as shown in FIG. 3, the tilt direction denotes the so-called radial tilt direction Tir that is the direction of shaft rotation about a shaft that is in the tangential direction Tz perpendicular to the aforementioned focus direction F and tracking direction T, but it is not limited thereto. In other words, the objective lens 34 may be configured to be driven in the so-called tangential tilt direction that is the direction of shaft rotation about a shaft that is in the tracking direction. In addition, the objective lens 34 may also be configured to be driven in four axial directions so that the objective lens 34 can be driven in the radial tilt direction and the tangential tilt direction. In this manner, in the case where the objective lens 34 is also configured to be driven in the tangential tilt direction, due to the later-described effects of the objective lens 34, the coma aberration in the tangential tilt direction can also be effectively reduced without a change in temperature.

The objective lens driving unit 49 includes a fastening portion and a lens holder 47 that holds the objective lens 34 and that is a driving portion of moving with respect to the fastening portion. The objective lens driving unit 49 is configured to have a coil or magnet for generating a driving force in the driving direction. In addition, the objective lens driving unit 49 may be of the aforementioned suspension supporting type. In addition, the objective lens driving unit 49 may be of a shaft sliding type where the objective lens driving unit 49 is rotatably mounted to a supporting shaft of a fastening portion. The objective lens driving unit 49 includes, for example, a focus coil and a magnet for generating a driving force in the focus direction, or a tracking coil and a magnet for generating a driving force in the tracking direction, or a tilt coil and a magnet for generating a driving force in the tilt direction. Herein, instead of providing individual tilt coils and magnets for tilting, a difference in the driving forces generated in the focus coils that are aligned in the tracking direction or the tangential direction may be provided in the focus coils, so that the diving force can be generated in the tilt direction.

The objective lens 34 is a plastic single objective lens having a numerical aperture (NA) of about 0.85. Since the objective lens 34 is made of a plastic, improved mass productivity and light weight can be implemented in comparison with a glass objective lens in the related art.

In the case where the cover layer thickness of the optical disc 2 is changed due to the changeover of the recording layer or the production error or in the case where the environment temperature is changed, the spherical aberration of the objective lens 34 is corrected, that is, reduced by moving the collimator lens 35 in the optical axial direction to change the incidence magnification of the objective lens 34.

In addition, in the case where the environment temperature or the cover layer thickness is changed or in the case where the incidence magnification of the incident light beam associated with the change in environment temperature is changed, the coma aberration of the objective lens 34 is removed by tilting the objective lens 34 in the tilt direction by the objective lens driving unit 49 according to the control of the later-described control unit 50.

In addition, the objective lens 34 is mounted so that the optical axis of the fixed optic system 51 of the optical pickup 3 is substantially aligned with the optical axis of the objective lens 34. Herein, the fixed optic system 51 of the optical pickup 3 denotes optical parts excluding the objective lens 34, which are movably mounted to the objective lens driving unit 49 in at least three-axial directions. In other words, the fixed optic system 51 denotes a light-guiding optic system for guiding the light beam to the objective lens 34, which includes the collimator lens 35 that is driven only in the optical axial direction, the light source units 31 and 32, the light receiving unit 38, the start-up mirror 44, and various optical parts disposed in the optical path therebetween. In addition, the objective lens 34 is mounted on the lens holder 47 so as to be aligned with the optical axis of the fixed optic system 51 unlike the fixed optic system in the related art in which the objective lens is mounted to be tilted and adjusted by considering the original coma aberration. In other words, the objective lens 34 is mounted on the lens holder 47 in the reference state in which the objective lens is not moved so that the optical axis of the light beam that is guided by the fixed optic system 51 to be incident to the objective lens 34 is substantially aligned with the optical axis of the objective lens 34. Herein, the phrase "substantially aligned" means that about installation error range is available and that the absolute value of the installation angle $\theta_{OL}$ is sufficiently 0.15 deg or less. In addition, the so-called original coma aberrations of the various optical parts of the fixed optic system and the objective lens 34 can be removed by tilting the optical pickup 3 in the tilt direction as described later.

In addition, the objective lens 34 includes a range in which the lens tilt sensitivity $\Delta W_{LT}/\Delta\theta$ satisfies $|\Delta W_{LT}/\Delta\theta|<0.029$ in the use environment temperature range of the optical pickup 3. In other words, as described later, in general, if $|\Delta W_{LT}/\Delta\theta|\geqq 0.029$ is satisfied in all the use environment temperature range, the coma aberration is corrected by using the lens tilt sensitivity so as to be in a suitable range. However, it means that, when the plastic objective lens having a refractive index having a high temperature dependency is formed, the condition is not easy to satisfy but the limitation in forming the objective lens is too large. In the optical pickup 3 according to an embodiment of the invention, the later-described method that is described in detail in Section "4. Method of Lens Tilt Correction" is employed, so that the limitation in forming the objective lens 34 can be reduced, and the coma aberration can be suppressed so as to be in a suitable range.

In addition, the objective lens 34 described herein effectively condenses the light beams having the first to third wavelengths to the corresponding recording layers of the optical discs having different cover layer thicknesses in order to correspond to the first to third optical discs 11, 12, and 13, but an embodiment of the present invention is not limited thereto. In other words, for example, the objective lens 34 may be configured to effectively condense the light beam having the first wavelength, as dedicated to the first optical disc, to the first optical disc 11.

On the other hand, the multi-lens 40 is disposed in the optical path between the first beam splitter 36 and the light receiving unit 38, for example, to have a refractive plane so that the multi-lens 40 has the following functions. In other words, the multi-lens 40 applies a predetermined magnification and refracting power to the incident light beam to suitably condense the light beam on the light receiving plane of the light receiving unit 38 such as a photo detector of the light detector 39. The multi-lens 40 functions as a device for converting the dispersion angle of each of the backward incident light beams having the wavelengths so as to condense the light beams on a common light receiving unit 38. In other words, the multi-lens 40 has a dispersion angle converting function.

The light detector 39 includes the light receiving unit 38 constructed with light receiving devices such as a photo detector. The light detector 39 receives the returning light beams having the first to third wavelengths, which are condensed by the multi-lens 40, by using the common light receiving unit 38. Therefore, the light detector 39 outputs the information signals (RF signal) to the pre-amplifier 14 and detects various signals such as the tracking error signal and the focus error signal to output the signals to the servo control unit 9.

The optical pickup 3 having the above configuration performs focus servo and tracking servo by driving and moving the objective lens 34 based on the focus servo signal and the tracking servo signal that are generated from the returning light detected by the light detector 39. In the optical pickup 3, the objective lens 34 is driven and moved to be moved to the focusing position which is focused on the signal recording plane of the optical disc 2, so that the light beam is focused on the recording track of the optical disc 2. Therefore, the recording or reproducing of the information signals are performed on the optical disc 2. In addition, in the optical pickup 3, the coma aberration caused by the warpage of the optical disc can be reduced by tilting the objective lens 34 in the tilt direction by using the objective lens driving unit 49. Accordingly, the optical pickup 3 and the optical disc apparatus 1 using the optical pickup 3 have effective recording and reproducing characteristics.

However, in the case where the numerical aperture of the lens for a BD similar to the objective lens 34 is set to be too large, the spherical aberration amount caused by the change in cover layer thickness caused by the changeover of recording layer or the error of the cover layer thickness is large. In addition, since the objective lens 34 is made of a material of plastic instead of glass, the temperature dependency of the refractive index is high. Therefore, the spherical aberration caused by the change in temperature is large. In order to correct the spherical aberration, the incidence magnification of the light beam incident to the objective lens 34 is to be changed. Due to the change in incidence magnification, the lens tilt sensitivity is also changed, so that the tilt correction value of the objective lens 34 is deviated from the optimum value.

However, the optical pickup 3 according to an embodiment of the present invention includes a control unit 50 that performs calculation to adjust a position of the collimator lens 35 or a slope of the objective lens 34 associated with the change in temperature. The RF signal from the light detector 39 is input to the control unit 50, and the temperature signal of the temperature from the temperature detecting device 48 is input to the control unit 50. The control unit 50 performs the spherical aberration correction by checking the jitter amount of the input temperature signal or RF signal and driving the collimator lens driving unit 45 to move the collimator lens 35 in the optical axial direction. In addition, the control unit 50 performs the coma aberration correction by driving the objective lens driving unit 49 to tilt the objective lens 34 in the tilt direction so that the quality of the signal detected by the light detector 39 is good.

In addition, in the optical pickup 3, the control unit 50 functions as a lens tilt sensitivity sensing unit that senses the lens tilt sensitivity of the objective lens 34. If the coma aberration amount occurring at the time of lens tilt of the objective lens 34 is denoted by $\Delta W_{LT}$ [λrms] and if the lens tilt amount is denoted by $\Delta\theta$ [deg], the lens tilt sensitivity is denoted by $\Delta W_{LT}/\Delta\theta$.

The control unit 50, as a lens tilt sensitivity sensing unit, senses the lens tilt sensitivity according to the temperature based on the signal detected by the temperature detecting device 48. Herein, the lens tilt sensitivity is a value that is uniquely defined according to the temperature by the shape of the objective lens 34 or the refractive index or the like of the constituent material thereof. The lens tilt sensitivity is determined based on the relationship of the lens tilt sensitivity to the temperature and the temperature that is obtained on the signal detected by the temperature detecting device 48. Next, in the case where the lens tilt sensitivity is equal to or larger than a predetermined value, the control unit 50 that detects the lens tilt sensitivity determines that the lens tilt correction can be performed, so that the control unit 50 performs the lens tilt correction by tilting the objective lens 34. In addition, in the case where the lens tilt sensitivity is smaller than the predetermined value, the control unit 50 determines that the lens tilt correction is difficult to perform, so that the control unit 50 does not perform the lens tilt correction. Herein, the predetermined value is a predetermined threshold indicating whether or not the lens tilt correction can be performed. The predetermined value will be described later in detail.

In addition, herein, the control unit 50 is configured to sense the lens tilt sensitivity based on the temperature detected by the temperature detecting device 48, but an embodiment of the present invention is not limited thereto. In other words, the control unit 50 may be configured to sense the lens tilt sensitivity based on the position of the collimator lens 35 detected by the collimator position detecting unit 46. In this case, the lens tilt sensitivity is determined based on the relationship of the lens tilt sensitivity to the incidence magnification of the light beam incident to the objective lens 34 and the position of the collimator lens 35 based on the signals detected by the collimator position detecting unit 46. This is based on the fact that the relationship between the position of the collimator lens 35 and the incidence magnification is uniquely defined and the fact that the incidence magnification used to correct the spherical aberration is uniquely defined according to the change in temperature. In the case where the detection result of the collimator position detecting unit 46 is used, the aforementioned temperature detecting device 48 may not be provided. In addition, in the case where the detection result of the collimator position detecting unit 46 is used to sense the lens tilt sensitivity and in the case of the multi-layer optical disc, the lens tilt sensitivity may be configured to be sensed based on the relationship of the lens tilt sensitivity to the incidence magnification in each of the recording layers. This is because each recording layer of the multi-layer optical disc has a different cover layer thickness and because the position of the collimator lens 35 for correcting each spherical aberration to be a suitable value is different. Therefore, the coma aberration can be more effectively reduced by using the relationship in each recording layer.

Moreover, the control unit 50 may be configured so that the lens tilt sensitivity is sensed based on the change in jitter detected at the time of applying the tilt wobbling operation to the objective lens 34. Herein, in the state that the focus servo and the tracking servo are ON, the objective lens 34 is operated to be fluctuated in the tilt direction, and in this case, the lens tilt sensitivity is sensed based on the change in jitter. The process is based on the following characteristics of the lens tilt sensitivity and the change in jitter. In other words, in the case where the lens tilt sensitivity is such a sensitivity that the lens tilt correction can be performed, there is a characteristic that the change in jitter is large. On the other hand, in the case where the lens tilt sensitivity is such a sensitivity that the lens tilt correction is difficult to perform, there is a characteristic that the change in jitter is small. The aforementioned process is based on the above characteristics. Therefore, in this case, if the change in jitter is larger than a threshold of the change in jitter having the lens tilt sensitivity that is equal to or larger than the aforementioned predetermined value, the control unit 50 determines based on the threshold that the lens tilt sensitivity is equal to or larger than the predetermined value, so that the control unit 50 performs the lens tilt correction. On the other hand, if the change in jitter is smaller than the threshold, the control unit 50 determines that the lens tilt sensitivity is smaller than the predetermined value, so that the control unit 50 does not perform the lens tilt correction.

In addition, the control unit 50 may be configured to sense the lens tilt sensitivity based on the RF signal sensed at the time of applying the tilt wobbling operation to the objective lens 34. Herein, in the state that at least the focus servo is ON, the objective lens 34 is operated to be fluctuated in the tilt direction, and in this case, the lens tilt sensitivity is sensed based on the change in RF signal. The process is based on the following characteristics of the lens tilt sensitivity and the change in RF signal. In other words, in the case where the lens tilt sensitivity is such a sensitivity that the lens tilt correction can be performed, there is a characteristic that the change in RF signal is large. On the other hand, in the case where the lens tilt sensitivity is such a sensitivity that the lens tilt correction is difficult to perform, there is a characteristic that the change in RF signal is small. The aforementioned process is based on the above characteristics. Therefore, in this case, if the change in RF signal is larger than a threshold of the change in RF signal having the lens tilt sensitivity that is equal to or larger than the aforementioned predetermined value, the control unit 50 determines based on the threshold that the lens tilt sensitivity is equal to or larger than the predetermined value, so that the control unit 50 performs the lens tilt correction. On the other hand, if the change in RF signal is smaller than the threshold, the control unit 50 determines that the lens tilt sensitivity is smaller than the predetermined value, so that the control unit 50 does not perform the lens tilt correction.

3. Lens Tilt Sensitivity of Objective Lens

Next, a lens tilt sensitivity of the objective lens 34 included in the optical pickup 3 or the like according to an embodiment of the present invention will be described, after a behavior of the spherical aberration occurring in the optic system of the aforementioned optical pickup 3 is described in detail.

Figure 4:
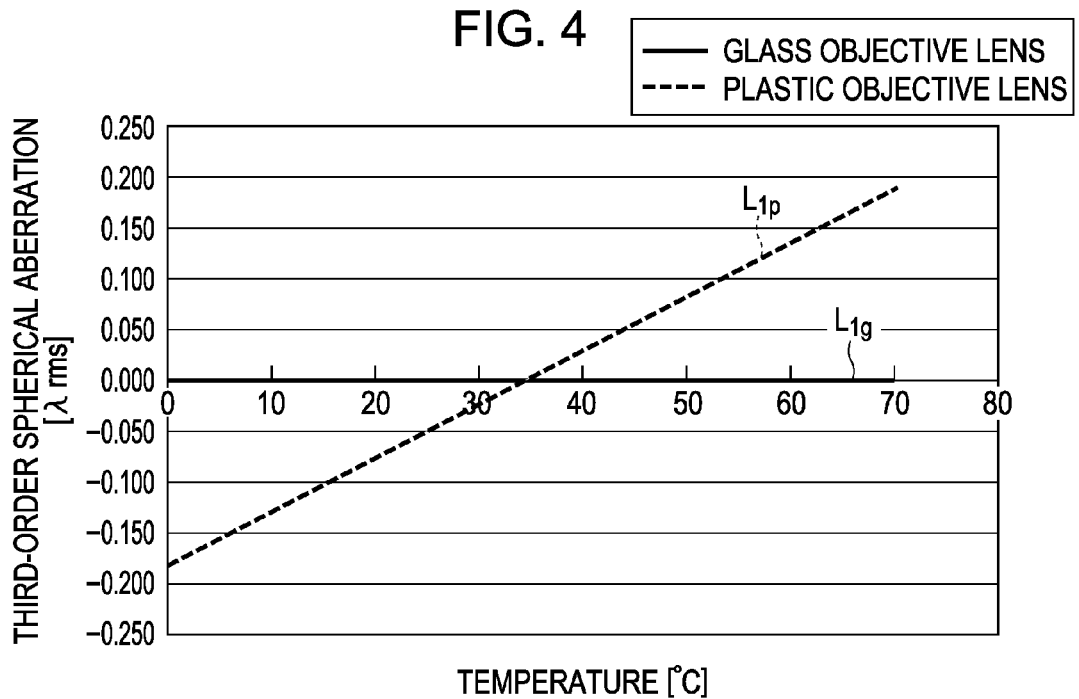
FIG. 4 is a diagram showing a relationship between a change in temperature and an occurring spherical aberration amount of a glass objective lens and a plastic objective lens.

Firstly, FIG. 4 shows the relationship between the spherical aberration amounts occurring according to the change in temperature of the glass objective lens for a BD and the plastic objective lens of a BD, of which focus distances are equal to each other at the design center having 35° C. In FIG. 4, the horizontal axis represents a temperature [° C.], and the vertical axis represents a three-order spherical aberration [λrms]. In addition, $L_{1g}$ represents a relationship of the glass objective lens, and $L_{1p}$ represents a relationship of the plastic objective lens. As shown in FIG. 4, since the change in refractive index of the plastic objective lens according to the change in temperature is large, the changing amount of the spherical aberration of the plastic objective lens depending on the change in temperature is larger than that of the glass objective lens.

Figure 5:
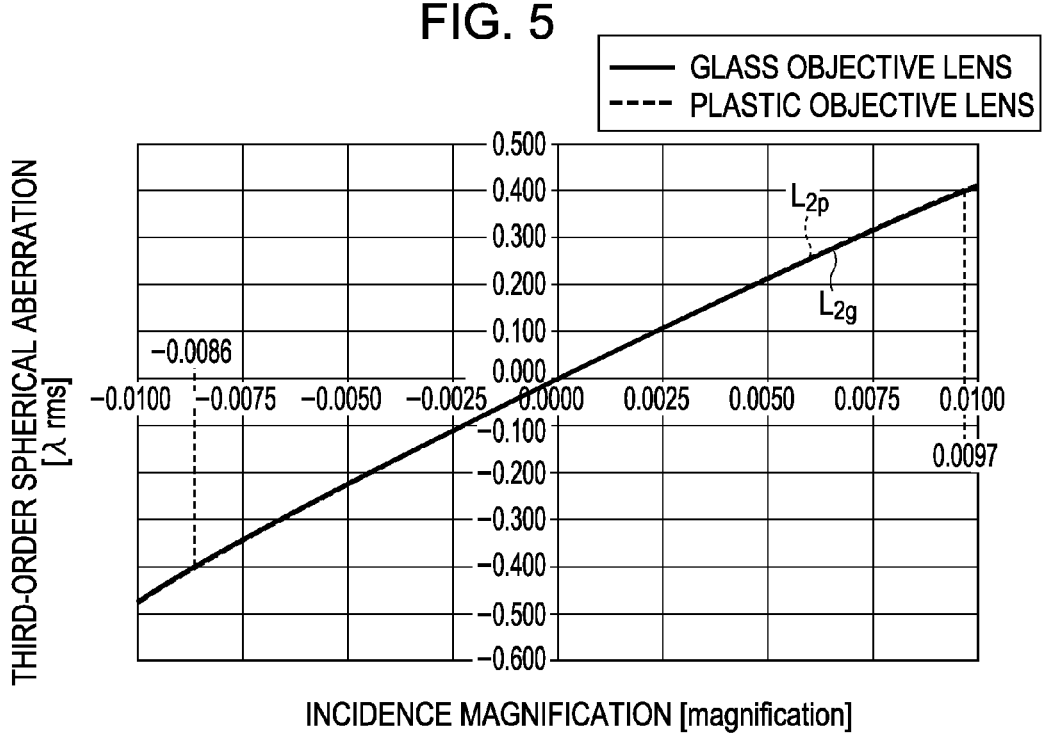
FIG. 5 is a diagram showing a relationship between an occurring three-order spherical aberration and an incidence magnification as a magnification characteristic of a glass objective lens and a plastic objective lens.

Next, FIG. 5 shows the magnification characteristics of the aforementioned glass and plastic objective lenses. In FIG. 5, the horizontal axis represents the incidence magnification of the objective lens, and the vertical axis represents the three-order spherical aberration [λrms]. In addition, $L_{2g}$ represents a relationship of the glass objective lens, and $L_{2p}$ represents a relationship of the plastic objective lens. As shown in FIG. 5, since the magnification characteristic is defined by the focus distance and the numerical aperture NA, there is no difference in the characteristic between the two lenses. In other words, FIG. 5 shows that the changes in magnification necessary for causing the same spherical aberrations by the glass and plastic objective lenses are equal to each other.

In addition, as shown in FIGS. 4 and 5, since the spherical aberration of the glass objective lens is not almost changed according to a change in environment temperature, the magnification correction may not be performed. On the contrary, since the spherical aberration of the plastic objective lens is greatly changed according to the environment temperature, the magnification correction for canceling the spherical aberration caused by the change in temperature may be performed.

Figure 6:
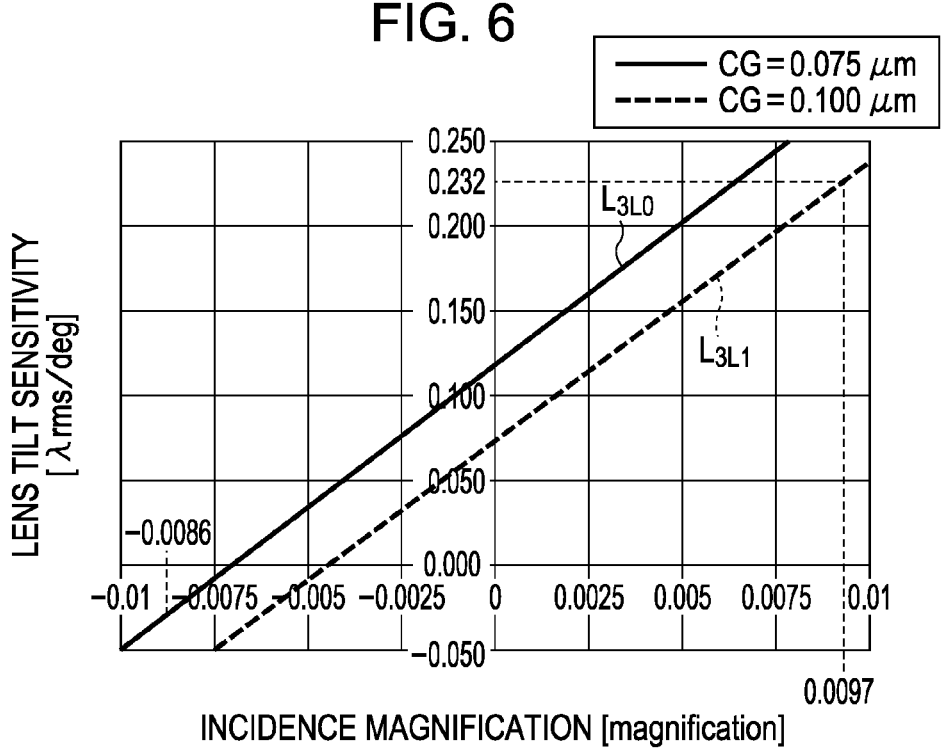
FIG. 6 is a diagram showing a relationship between an incidence magnification and a lens tilt sensitivity of each recording layer in a two-layer optical disc.

Next, FIG. 6 shows a relationship between the incidence magnification of the light beam incident to the objective lens 34 made of a plastic and the lens tilt sensitivity. The lens tilt sensitivity has a different value according to the cover layer thickness, and FIG. 6 shows the relationship thereof with respect to the recording layers L0 and L1. In FIG. 6, the horizontal axis represents the incidence magnification, and the vertical axis represents the lens tilt sensitivity. In addition, $L_{3L0}$ represents the lens tilt sensitivity in the case of condensing the light beam on the recording layer L0 having a cover layer thickness of 0.100 μm; and $L_{3L1}$ represents lens tilt sensitivity in the case of condensing the light beam on the recording layer L1 having a cover layer thickness of 0.075 μm. As shown in FIG. 6, in the case where the incidence magnification is changed according to a predetermined relationship with respect to each recording layer, the lens tilt sensitivity is changed.

Now, the spherical aberration, which changes the incidence magnification of the objective lens 34, is described. As factors of causing the spherical aberration, which changes the incidence magnification, there are considered a change in temperature, a change in wavelength, a change in cover layer thickness, and an original spherical aberration amount. In the description hereinafter, the occurring sensitivity $\Delta SA_T/\Delta T$ to the change in temperature is set to α; the occurring sensitivity $\Delta SA_\lambda/\Delta \lambda$ to the changing in wavelength is set to β; the occurring sensitivity $\Delta SA_d/\Delta d$ to the change in cover layer thickness is set to γ; and the original spherical aberration amount is set to $SA_{org}$. If the α, β, γ, and $SA_{org}$ are used, the estimated occurring maximum spherical aberration amount ΔSA may be expressed by the following equation (1).

$$\Delta SA = \alpha \cdot \Delta T + \beta \cdot \Delta \lambda + \gamma \cdot \Delta d + SA_{org} \tag{1}$$

In the environment and conditions where the optical pickup 3 is used are taken into consideration, the maximum spherical aberration is about ±0.400 λrms. In order to correct the spherical aberration, in the case where the magnification correction is performed by driving the collimator lens 35, the range of the use magnification m is about −0.0086≦m≦0.0097 that is obtained from the relationship shown in FIG. 5. At this time, the lens tilt sensitivity is changed in the range 0≦|W/Δθ|≦0.232. In other words, it shows that the coma aberration occurring in the same lens tilt angle is greatly changed according to the change in incidence magnification.

Now, the problem in "assembling and adjusting of the objective lens" in the related art is described. The case where a plastic lens, of which lens tilt sensitivity is changed, is used and the objective lens is adjusted by using a method of tilting the objective lens and canceling and reducing the coma aberration at the time of assembling and adjusting the objective lens in the related art is considered.

Figure 7:
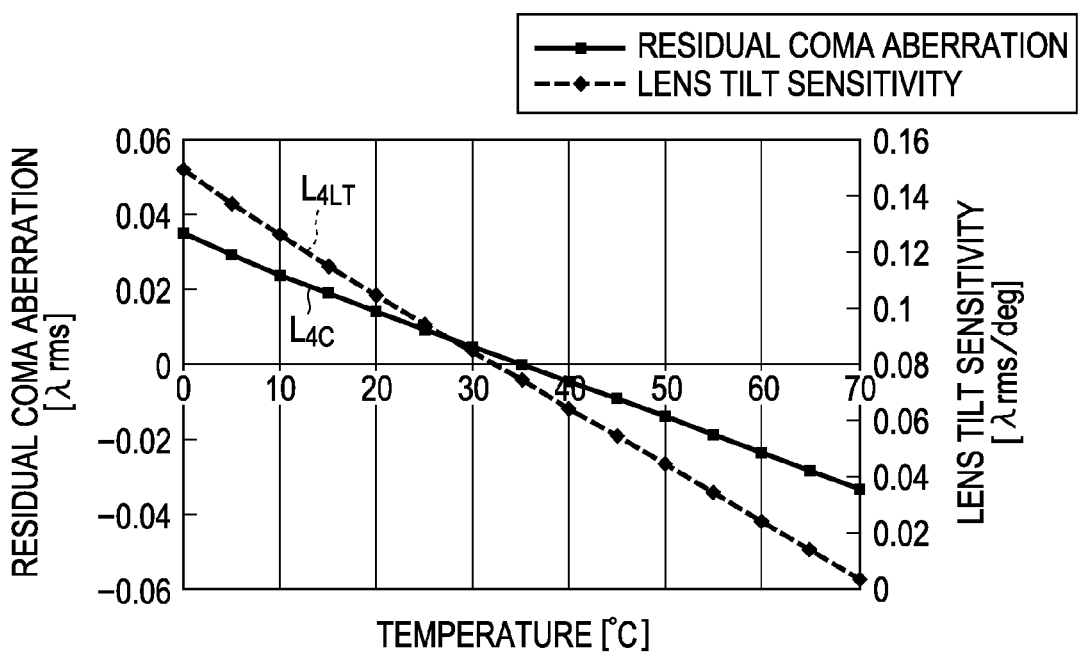
FIG. 7 is a diagram showing a relationship between a residual coma aberration amount and a lens tilt sensitivity associated with a change in temperature.

The coma aberration of the objective lens and the fixed optic system is generally limited to about 0.035 λrms. The coma aberration is corrected at the room temperature with the sensitivity (lens tilt sensitivity) $\Delta W_{LT}/\Delta\theta$=0.074 [λrms/deg], the original lens tilt angle is $\theta_{org}$=0.47 deg. If the change in temperature occurs in the state where the objective lens is adjusted by the angle $\theta_{org}$ and the angle is maintained, as shown in FIG. 7, the lens tilt sensitivity is different according to each temperature, so that the residual coma aberration occurs. In the case where the magnification correction is performed on the spherical aberration caused by the change in temperature by driving the collimator, the incidence magnification of the objective lens is changed, and the lens tilt sensitivity is changed associated with the change in incidence magnification, so that the residual aberration occurs. In other words, although the to-be-corrected coma aberration amount is equal to the coma aberration amount caused by the tilt adjusting of the objective lens at the room temperature at the time of the adjusting, the latter coma aberration amount is changed due to the change in incidence magnification associated with the change in temperature, so that the coma aberration remains. In addition, FIG. 7 shows the change in lens tilt sensitivity and the change in residual coma aberration associated with the change in temperature. In FIG. 7, the horizontal axis represents the temperature [° C.], and the vertical axis represents the lens tilt sensitivity [λrms/deg] and the residual coma aberration "λrms". $L_{41T}$ represents the change in lens tilt sensitivity associated with the change in temperature, and $L_{4C}$ represents a residual coma aberration associated with the change in temperature.

Figure 8:
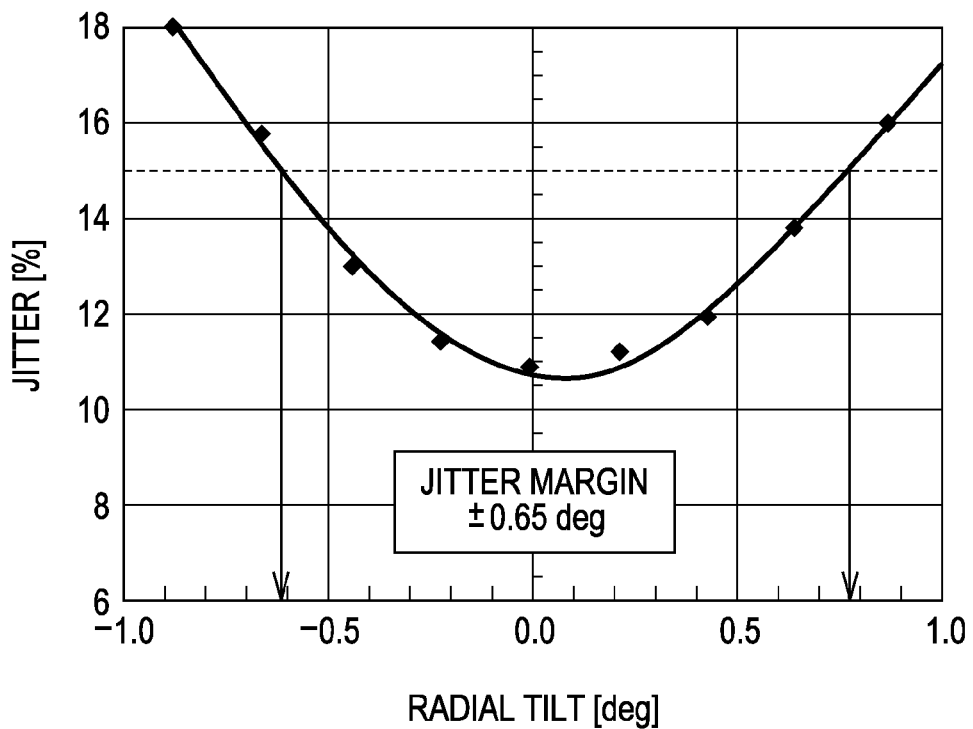
FIG. 8 is a diagram showing a relationship between a radial tilt amount and a jitter.

In general, the radial disc tilt margin $2\theta_{RAD}$ indicating the angle for maintaining a quality of signal at the time of tilting the BD disc in the radial direction is set to be in a range of about 1.3 to 1.4 deg. Therefore, in the other case where the coma aberration corresponding to the disc tilt exceeding 0.65 deg remains, good quality of signal may not be maintained, and as shown in FIG. 8, the system has a defect. In addition, FIG. 8 is a diagram showing the radial tilt allowable amount. In FIG. 8, the horizontal axis represents the radial tilt amount [deg], and the vertical axis represents a jitter [%]. As shown in FIG. 8, in order to maintain the jitter to be 15% or less, the radial tilt allowable amount considering a jitter margin is set to about ±0.65 deg.

Four factors that are to be compared and checked with the radial tilt allowable amount are described. Firstly, the first factor is the warpage of the optical disc, which is denoted by $\theta_{DISC}$.

In addition, the second factor is the disc tilt angle $\theta_T(T)$ (referred to as a "temperature characteristic LT change") that is used to correct the residual coma aberration caused by the change in temperature. Firstly, if the coma aberration occurring at the time of tilting the disc is denoted by $\Delta W_{DT}$ [λrms] and if the disc tilt is denoted by $\Delta\theta$ [deg], the disc tilt sensitivity is defined by $\Delta W_{DT}/\Delta\theta$. In addition, if the temperature of the plastic objective lens is denoted by T, the lens tilt sensitivity is denoted by $\Delta W_{LT}(T)/\Delta\theta$. At this time, the disc tilt angle $\theta_T(T)$ that is used to correct the residual coma aberration caused by the change in temperature is expressed by the following equation (2). In addition, in the right handed side of the equation (2), the numerator indicates the coma aberration amount that is changed according to the change $\Delta T$ in temperature, and the denominator indicates the disc tilt sensitivity.

$$\theta_T(T)=\{[(\Delta W(T)_{LT}/\Delta\theta)-(\Delta W(T+\Delta T)_{LT}/\Delta\theta)]\times \theta_{org}\}/(\Delta W_{DT}/\Delta\theta) \quad (2)$$

In addition, the third factor is the radial tilt angle $\theta_{OL}(\theta_{oi})$ that is used to correct the coma aberration caused by the installation error. The installation error $\theta_{oi}$ of the objective lens 34 is generally limited to about 0.15 deg. The disc tilt angle $\theta_{OL}(\theta_{oi})$ that is used to correct the coma aberration caused by the error $\theta_{oi}$ is expressed by the following equation (3).

$$\theta_{OL}(\theta_{oi})=\theta_{oi}\times(\Delta W(T)_{LT}/\Delta\theta)/(\Delta W_{DT}/\Delta\theta) \quad (3)$$

In addition, the fourth factor is the disc tilt amount that is used to correct the residual coma aberration corresponding to the remaining amount after the optical axis is adjusted, which is denoted by $\theta_{IH}$.

The first to fourth factors and the radial tilt required amount $\theta_{RAD}$ are necessary to satisfy the following equation (4). In other words, the radial tilt required amount $\theta_{RAD}$ introduced from the first to fourth factors is necessary to be less than the radial tilt allowable amount of 0.65 deg.

$$\theta_{RAD}=\theta_{DISC}+\theta_T(T)+\theta_{OL}+\theta_{IH}\leq 0.65 \text{ [deg]} \quad (4)$$

Herein, in order to describe the problem of the "assembling and adjusting of the objective lens" in the related art, the residual coma aberration amount at the time of the change in temperature and the influence on the margins added with the aforementioned four factors at the time of high temperature and the time of low temperature are shown in Table 1 as a comparative example. Herein, the lens tilt angle represents a combination in which the change in lens tilt sensitivity is increased by taking into consideration the use wavelength and the cover layer thickness as well as the condition of the real use environment temperature. In addition, Table 1 shows an example of using the method of adjusting the objective lens in the related art as a comparative example before the description of the optical pickup according to an embodiment of the present invention. In other words, Table 1 shows the example of tilting the objective lens by only 0.47 deg with respect to the fixed optic system so that the residual coma aberration is 0 in the room temperature of 35° C.

TABLE 1

Case of Original Coma Angle Correction (Comparative Example)

|  |  | High Temperature | Room Temperature | Low Temperature |
|---|---|---|---|---|
| *Lens Tilt Adjusting and Changing Coma Aberration Amount at Time of Temperature Change | | | | |
| Lens Tilt State $\theta_{org}$ = 0.47 deg | | | $\theta_{org}$ 0.47 deg | |
| Temperature | [° C.] | 62 | 35 | 0 |
| Cover Layer Thickness | [mm] | 0.1 | 0.1 | 0.075 |
| Lens Tilt Sensitivity | [λrms/deg] | 0 | 0.074 | 0.232 |
| Lens Tilt Angle | [deg] | 0.47 | 0.47 | 0.47 |

TABLE 1-continued

Case of Original Coma Angle Correction (Comparative Example)

| | | High Temperature | Room Temperature | Low Temperature |
|---|---|---|---|---|
| Original Coma Aberration | [λrms] | 0.035 | 0.035 | 0.035 |
| Lens Tilt Coma Aberration | [λrms] | 0 | −0.035 | −0.110 |
| Residual Coma Aberration | [λrms] | 0.035 | 0 | −0.075 |
| *Calculation of Margin of Residual Coma Aberration | | | | |
| $\theta_{DISC}$ Warpage of Disc | [deg] | 0.40 | 0.40 | 0.40 |
| $\theta_T(T)$ Temperature Characteristic LT Change | [deg] | 0.32 | 0.00 | 0.93 |
| $\theta_{OL}$ Installation Error | [deg] | 0.00 | 0.10 | 0.44 |
| $\theta_{IH}$ After-Adjusting Remaining Amount | [deg] | 0.05 | 0.05 | 0.05 |
| $\theta_{RAD}$ Tilt Required Amount | [deg] | 0.77 | 0.55 | 1.82 |
| *Lens Tilt Correction Required Amount | | | | |
| Lens Tilt Amount | [deg] | ∞ | 0.81 | 0.63 |

According to Table 1, the aforementioned equation (4) is not satisfied in the high temperature side and in the low temperature side, and the margin of the one side exceeds 0.65 deg. Herein, it is considered to perform the lens tilt correction on the coma aberration corresponding to $\theta_{RAD}$. In general, due to the characteristics of the actuator (corresponding to the objective lens driving unit 49) at the time of tilt, the tilt correctable angle $\theta_{ActMax}$ is in a range not exceeding 1.5 deg. The following equation (5) corresponds to the low temperature side, and the following equation (6) corresponds to the high temperature side.

Sensitivity (High)-Low Temperature Side:

$$\theta_{RAD}(0° \text{ C.}) \times (\Delta W_{DT}/\Delta\theta)/(\Delta W(T)_{LT}/\Delta\theta) = 0.63 \leq \theta_{ActMax} \quad (5)$$

Sensitivity (Low)-High Temperature Side:

$$\theta_{RAD}(62° \text{ C.}) \times (\Delta W_{DT}/\Delta\theta)/(\Delta W(T)_{LT}/\Delta\theta) = \infty \leq \theta_{ActMax} \quad (6)$$

As shown in Table 1 and the equation (5), in the low temperature side, since the lens tilt sensitivity is high, a quality of signal can be maintained by correcting the occurring coma aberration by using the lens tilt while maintaining the characteristics of the actuator. On the other hand, as shown in Table 1 and the equation (6), in the high temperature side, since the lens tilt sensitivity is not provided, the coma aberration may not be corrected due to the tilt characteristics of the actuator, so that a quality of signal may not be maintained.

Figure 9:
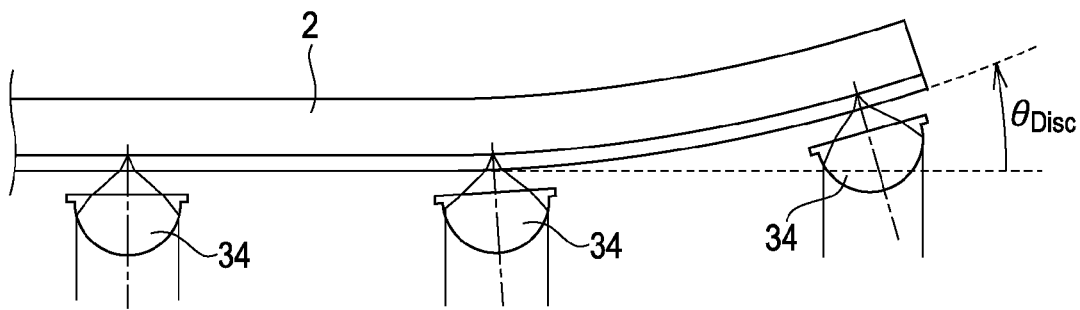
FIG. 9 is a diagrammatic view showing a radial warping state of an optical disc and a lens tilt correction in inner and outer circumferential portions of the disc.

In addition, in a general optical pickup system, the radial direction warpage defined according to the BD optical disc standard is set to $\theta_{Disc}=0.4$ deg. In a system where the coma aberration is corrected by the objective lens tilt, as shown in FIG. 9, the lens tilt angle is adjusted. More specifically, the lens tilt angle of the objective lens 34 is adjusted so that the influence of the disc tilt on the coma aberration at each recording/reproducing position over a range from the inner circumference portion to the outer circumference portion of the optical disc is reduced. The lowest objective lens tilt sensitivity necessary for performing the correction on the warpage of the optical disc can be determined as follows.

The coma aberration amount caused by the warpage of the optical disc having a value of 0.4 deg is $\Delta W_{DT}/\Delta\theta \times \theta_{Disc}=0.11$ [λrms/deg]×0.4 [deg]=0.044λrms. If the coma aberration amount is in the tilt angle allowable range of the actuator, the coma aberration can be corrected. In other words, if the coma aberration amount is in the range satisfying the following equation (8), the coma aberration can be corrected.

$$0.044/(\Delta W(T)_{LT}/\Delta\theta) \leq \theta_{ActMax} \quad (8)$$

In other words, $\theta_{ActMax}$ denotes the tilt angle allowable range of the actuator, which is about 1.5 deg. Therefore, according to the equation (8), the minimum value necessary as the lens tilt sensitivity is calculated by the following equation (9). Herein, in the temperature corresponding to the lens tilt sensitivity substantially satisfying the equation (9), the coma aberration can be reduced by using the lens tilt sensitivity of the objective lens, that is, by the lens tilt correction. In addition, if the objective lens satisfies the relationship of the aforementioned equation (9) in the use environment temperature range, as described above, the coma aberration can be reduced by using the lens tilt sensitivity.

$$|\Delta W_{LT}/\Delta\theta| \geq 0.029 \quad (9)$$

In the optical pickup 3 according to an embodiment of the present invention, even in the case of using the objective lens 34 that do not satisfy the relationship of the aforementioned equation (9) in the use environment temperature range, the coma aberration may be in a suitable range.

4. Lens Tilt Correction Process

Now, a process of obtaining a suitable coma aberration in the optical pickup 3 including the plastic objective lens 34 having the condition that the lens tilt sensitivity is $|\Delta W_{LT}/\Delta\theta|<0.029$ in the use environment temperature range is described.

Figure 10A:
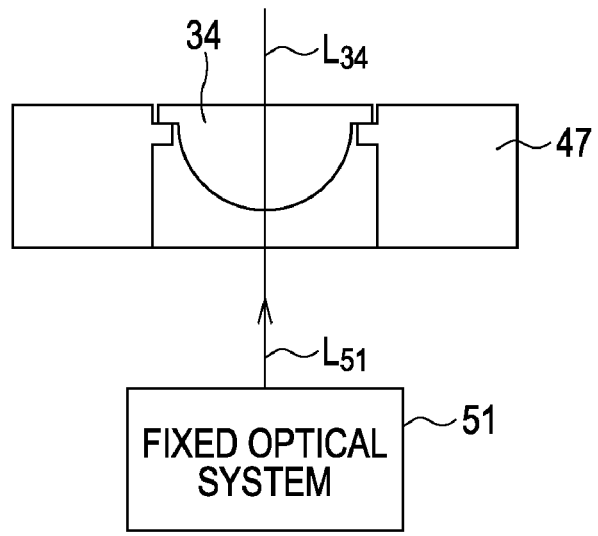
FIG. 10A is a diagrammatic view showing an assembling angle of the objective lens constituting an optical pickup according to an embodiment of the present invention.
Figure 10B:
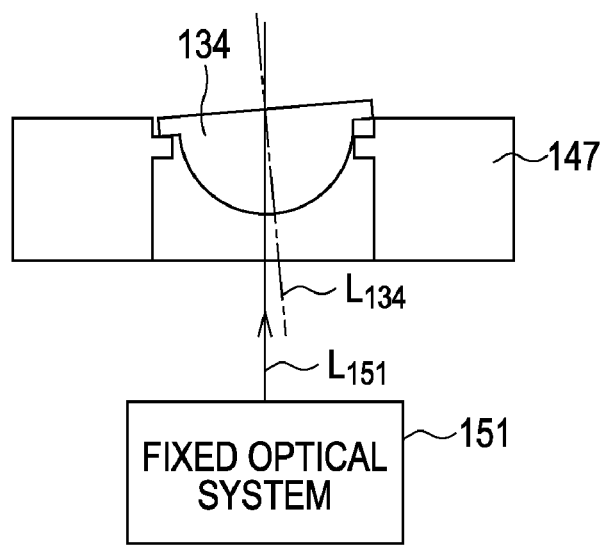
FIG. 10B is a diagrammatic view showing an assembling angle of the objective lens in the related art in comparison with an embodiment of the present invention.

In the optical pickup 3, the lens tilt correction is not performed on the coma aberration occurring in the fixed optic system and the objective lens 34 at the time of assembling and adjusting the objective lens 34 to the lens holder 47. In other words, as shown in FIG. 10A, the assembling angle of the objective lens 34 is disposed so that the optical axis $L_{34}$ of the objective lens 34 is substantially aligned with the optical axis $L_{51}$ of the light beam that is guided from the fixed optic system 51 to the objective lens 34. In addition, as described above, the method of performing the correction only in the case of having the lens tilt sensitivity is employed. In other words, the objective lens 34 is mounted in the state that the optical axis of the objective lens 34 is not tilted with respect to the optical axis of the fixed optic system, that is, in the state that the objective lens is disposed to be flat. On the contrary, in the "assembling and adjusting of the objective lens" in the related art as the aforementioned comparative example, as shown in the FIG. 10B, the objective lens is adjusted. In the comparative example shown in FIG. 10B, the objective lens 134 is configured to be mounted on the lens holder 147 so that the optical axis $L_{134}$ of the objective lens 134 is tilted by the original coma aberration with respect to the optical axis $L_{151}$ of the fixed optic system 151.

Figure 11:
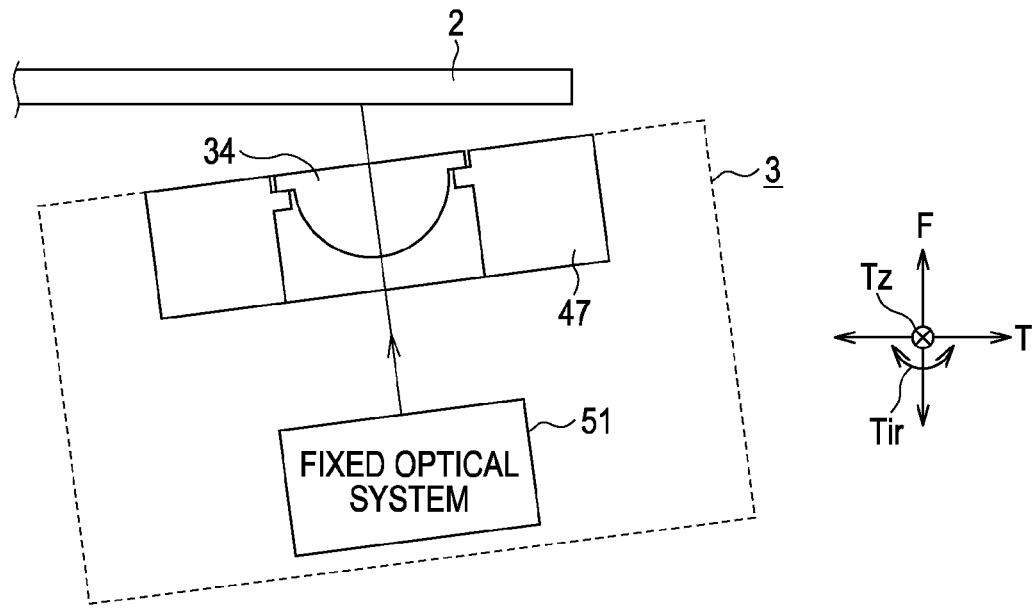
FIG. 11 is a diagrammatic view showing adjusting of a tilt angle of an optical pickup at the time when an optical disc apparatus of an optical pickup according to an embodiment of the present invention is configured.
Figure 12:
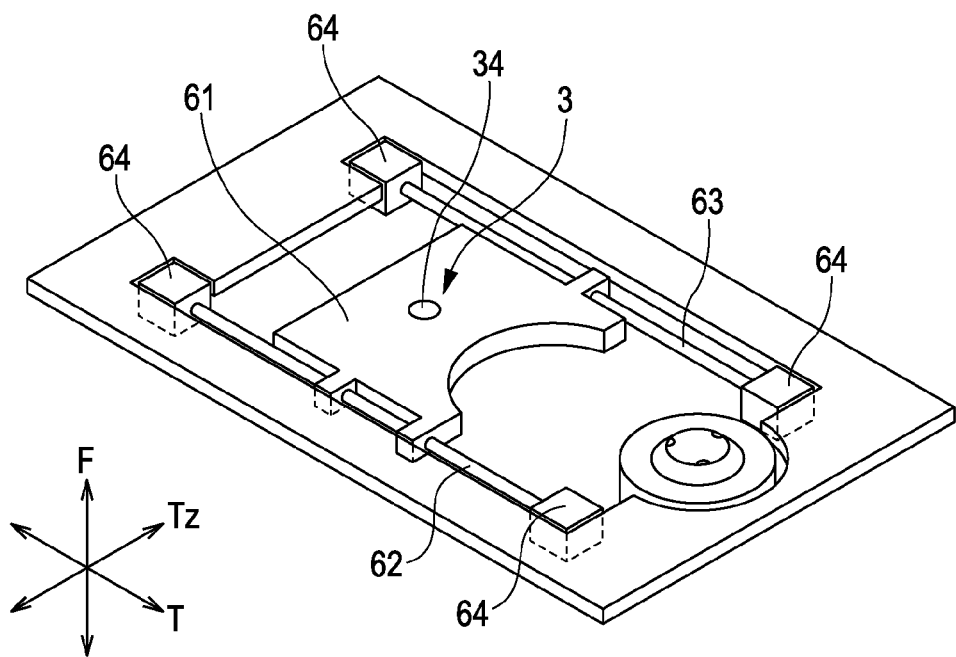
FIG. 12 is a diagrammatic view showing an optical disc apparatus for explaining an example of a skew adjusting mechanism that adjusts the tilt angle of the optical pickup shown in FIG. 11.

In addition, in the optical pickup 3 shown in FIG. 10A, at the time of configuring the optical disc apparatus 1, the original coma aberration is suppressed by adjusting the tilt angle of the optical pickup 3 as shown in FIG. 11. More specifically, as shown in FIG. 12, the optical disc apparatus 1 includes a pickup base 61 on which the optical pickup 3 is installed and guide shafts 62 and 63 that supports the movement of the optical disc of the pickup base 61 in the radial direction, which is inserted into the pickup base 61. In addition, the optical disc apparatus 1 includes skew adjusting mechanisms 64 that are disposed at both ends of each of the guide shafts 62 and 63. The skew adjusting mechanism 64 is constructed with, for example, a spring that supports the guide shafts 62 and 63 from the upper portion in the focus direction F and an adjusting screw that adjusts the up-down direction heights of the guide shafts 62 and 63 by abutting the lower portions of the guide shafts 62 and 63 and pressing the guide shafts. In addition, by adjusting the up-down direction heights of the two end portions of each of the guide shafts 62 and 63 by using the skew adjusting mechanisms 64, the optical pickup 3 is mounted on the optical disc apparatus 1 at a desired installation height and the aforementioned tilt angle is adjusted in the aforementioned radial tilt direction. More specifically, the optical pickup 3 is adjusted by adjusting the heights of the two end portions of each of the guide shafts 62 and 63 by screwing the adjusting screws of the skew adjusting mechanisms 64 while monitoring the output of the optical pickup 3. In other words, the optical pickup 3 is mounted on the optical disc apparatus 1 in the state that the aforementioned original coma aberration is suppressed by adjusting the tilt angle in the radial tilt direction by using the skew adjusting mechanisms 64. In addition, the configuration of the skew adjusting mechanism is not limited to the aforementioned configuration, but any configuration capable of performing the skew adjustment of the optical pickup 3 may be used.

Herein, in order to describe advantages of the optical pickup 3 associated with the problems in the related art described with reference to Table 1, influence in the case where initial correction is not performed on the coma aberration of the fixed optic system or the like by using lens tilt is listed in Table 2. In the case where the environment temperature is changed, the same change in lens tilt sensitivity occurs irrespective of existence of the lens tilt correction of the original coma aberration. However, since the objective lens 34 is not tilted, the change in the coma aberration caused by the change in lens tilt sensitivity does not occur.

TABLE 2

Case of Not Performing Original Coma Angle Correction (Embodiment)

| | | High Temperature | Room Temperature | Low Temperature |
|---|---|---|---|---|
| *Lens Tilt Adjusting and Changing Coma Aberration Amount at Time of Temperature Change | | | | |
| Lens Tilt State | | | $\theta_{org}$ | |
| $\theta_{org}$ = 0.00 deg | | | 0.00 deg | |
| Temperature | [° C.] | 62 | 35 | 0 |
| Cover Layer Thickness | [mm] | 0.1 | 0.1 | 0.075 |
| Lens Tilt Sensitivity | [λrms/deg] | 0 | 0.074 | 0.232 |
| Lens Tilt Angle | [deg] | 0.00 | 0.00 | 0.00 |
| Original Coma Aberration | [λrms] | 0.035 | 0.035 | 0.035 |
| Lens Tilt Coma Aberration | [λrms] | 0.000 | 0.000 | 0.000 |
| Residual Coma Aberration | [λrms] | 0.035 | 0.035 | 0.035 |
| *Adjusting Optical Pickup Tilt | | | | |
| Residual Coma Aberration After Adjusting | [λrms] | 0.000 | 0.000 | 0.000 |
| *Calculation of Margin Of Residual Coma Aberration | | | | |
| $\theta_{DISC}$ Warpage Of Disc | [deg] | 0.40 | 0.40 | 0.40 |
| $\theta_T(T)$ Temperature Characteristic LT Change | [deg] | 0.00 | 0.00 | 0.00 |
| $\theta_{OL}$ Installation Error | [deg] | 0.00 | 0.10 | 0.44 |
| $\theta_{IH}$ After-Adjusting Remaining Amount | [deg] | 0.05 | 0.05 | 0.05 |
| $\theta_{RAD}$ Tilt Required Amount | [deg] | 0.45 | 0.55 | 0.89 |
| *Lens Tilt Correction Required Amount | | | | |
| Lens Tilt Amount | [deg] | ∞ | 0.81 | 0.31 |

In other words, as listed in Table 2, the disc tilt angle $\theta_T(T)$ necessary to correct the residual coma aberration according to the change in temperature, which is converted to the disc tilt as the aforementioned second factor, does not depend on the change in temperature, and an increase or decrease in disc tilt margin may not be considered.

The coma aberration of the fixed optic system, which is initially acquired and remains, can be cancelled by adjusting the tilt angle of the optical pickup 3 at the time of installing the optical pickup, and the coma aberration is not changed according to the change in temperature. Therefore, with respect to the items other than the second factor, if the same initial tilt correction is considered to perform, as shown in Table 2, the high temperature case is expressed by the equation (10). In the high temperature case, since the lens tilt sensitivity is low, good quality of signal can be maintained without applying the correction.

$$\theta_{RAD}(62° C.)=0.45≦0.65 \text{ [deg]} \quad (10)$$

On the other than, the low temperature case is expressed by the equation (11). In the high temperature case, the tilt angle exceeds the one side margin of 0.65 deg. However, as shown in the following equation (12), a quality of signal can be maintained by performing the lens tilt correction on the occurring coma aberration while maintaining the characteristics of the actuator.

$$\theta_{RAD}(0°\text{ C.})=0.89\geqq 0.65\text{ [deg]} \quad (11)$$

$$\theta_{RAD}(0°\text{ C.})\times(\Delta W_{DT}/\Delta\theta)/(\Delta W(T)_{LT}/\Delta\theta)=0.31\leqq\theta_{ActMax} \quad (12)$$

Accordingly, in the optical pickup 3, the original coma aberration is not corrected by the objective lens tilt, so that when the temperature is changed, even in any one of the high temperature environment and the low temperature environment, good quality of signal can be maintained in a range satisfying the margin.

In other words, in the case where the lens tilt sensitivity is smaller than the predetermined value similarly to the low temperature case, optical pickup 3 does not perform the lens tilt correction. In this case, as described above, the coma aberration can be suppressed to be in the margin by disposing the objective lens 34 to be flat so that the optical axis thereof is aligned with the fixed optic system 51 and by adjusting the tilt of the optical pickup 3.

On the other hand, in the case where the lens tilt sensitivity is equal to or larger than the predetermined value similarly to the room temperature case or the high temperature case, the optical pickup 3 tilts the objective lens 34 and performs the lens tilt correction, so that the coma aberration can be further reduced.

In addition, the lens tilt sensitivity that is equal to or larger than the predetermined value means that the object can be sufficiently achieved by the lens tilt sensitivity that is, for example, in the range expressed by the aforementioned equation (9). Furthermore, the range can be generalized as follows. In other words, the lens tilt sensitivity ($\Delta W_{LT}/\Delta\theta$) that satisfies the relation equation of $\{\theta_{RAD}\times(\Delta W_{LT}/\Delta\theta)\}/(\Delta W_{LT}/\Delta\theta)\leqq\theta_{ActMax}$ may be called the lens tilt sensitivity that is equal to or larger than the predetermined value. In addition, if the lens tilt sensitivity is expressed with magnification m as a variable, and if $\theta_{ActMax}$ is set to the aforementioned generalized value, the relation of $\{\theta_{RAD}\times(\Delta W_{LT}/\Delta\theta)\}/(W_{LT}(m)/\Delta\theta)\leqq 1.5$ can be obtained. In the relation equation, the numerator of the left handed side represents the coma aberration corresponding to margin consumption, and the denominator of the left handed side represents the lens tilt sensitivity corresponding to the magnification m. It is determined by the control unit 50 as the lens tilt sensitivity sensing unit whether or not the lens tilt sensitivity is equal to or larger than the predetermined value defined by the aforementioned relation equation, so that the coma aberration can be suppressed to be in a suitable range by using the plastic objective lens.

In this manner, the optical pickup 3 according to an embodiment of the present invention includes the light source unit 31, the objective lens 34, the light detector 39, the fixed optic system, the objective lens driving unit 49, and the control unit 50 that is the lens tilt sensitivity sensing unit. In addition, in the case where the lens tilt sensitivity is equal to or larger than the predetermined value, the optical pickup 3 performs the lens tilt correction by tilting the objective lens 34 so that the quality of the signal detected by the light detector 39 is improved. In addition, in the case where the lens tilt sensitivity is smaller than the predetermined value, the optical pickup 3 does not perform the lens tilt correction. In the optical pickup 3, the objective lens 34 is made of a plastic, so that improved mass productivity and light weight can be implemented. In addition, the configuration is made by taking into consideration the change in the lens tilt sensitivity, so that the compensation of the coma aberration can be performed even in the case where the environment temperature is changed.

In addition, the optical pickup 3 includes the objective lens 34 that is mounted on the lens holder 47 so that the optical axis of the objective lens 34 is aligned with the optical axis of the light beam that is guided by the fixed optic system and incident to the objective lens 34. In addition, the optical pickup 3 is mounted to be adjusted in the tilt direction so that the original coma aberration is reduced at the time of being mounted on the optical disc apparatus 1. The original coma aberration denotes a coma aberration of an optical part included in the fixed optic system or a coma aberration of the objective lens as described above. The optical pickup 3 suppresses the coma aberration in the case where the lens tilt sensitivity is decreased, for example, in the high temperature case, so that the optical pickup 3 can reduce the coma aberration without performing the lens tilt correction in the case where the lens tilt sensitivity is decreased. In addition, the optical pickup 3 is combined with the configuration of the aforementioned lens tilt correction, so that the compensation of the coma aberration can be performed even in the case where the environment temperature is changed. In other words, in the optical pickup 3 according to en embodiment of the present invention, mass productivity and light weight can be implemented, and good recording and reproducing characteristics can be implemented by performing good aberration correction.

In addition, the lens tilt sensitivity $\Delta W_{LT}/\Delta\theta$ of the objective lens 34 of the optical pickup 3 satisfies $|\Delta W_{LT}/\Delta\theta|<0.029$ in the use environment temperature range. In the optical pickup 3, when the plastic objective lens 34 is configured, even in the case where the aforementioned range is allowed to be included in the use environment temperature range, the coma aberration can be reduced, so that the selectivity with respect to the objective lens can be increased, and the configuration can be easily implemented. In addition, in the optical pickup 3, good aberration correction can be performed and the objective lens can be made of a plastic, so that mass productivity and light weight can be implemented.

5. Lens Tilt Correction Process for Two-Layer Optical Disc and Multi-Layer Optical Disc Now, a range of applying lens tilt correction on an optical disc having two or more layers is described. As described above, even in the case where the lens tilt sensitivity does not exist at the high temperature, the tilt angle is within the margin, a quality of signal has no problem. Herein, furthermore, in order to apply a stronger servo to disturbance or perturbation, a system that reads signals at the best point by the lens tilt correction in a range having the lens tilt sensitivity that is merely used to correct the residual coma aberration is considered to be added.

Figure 13:
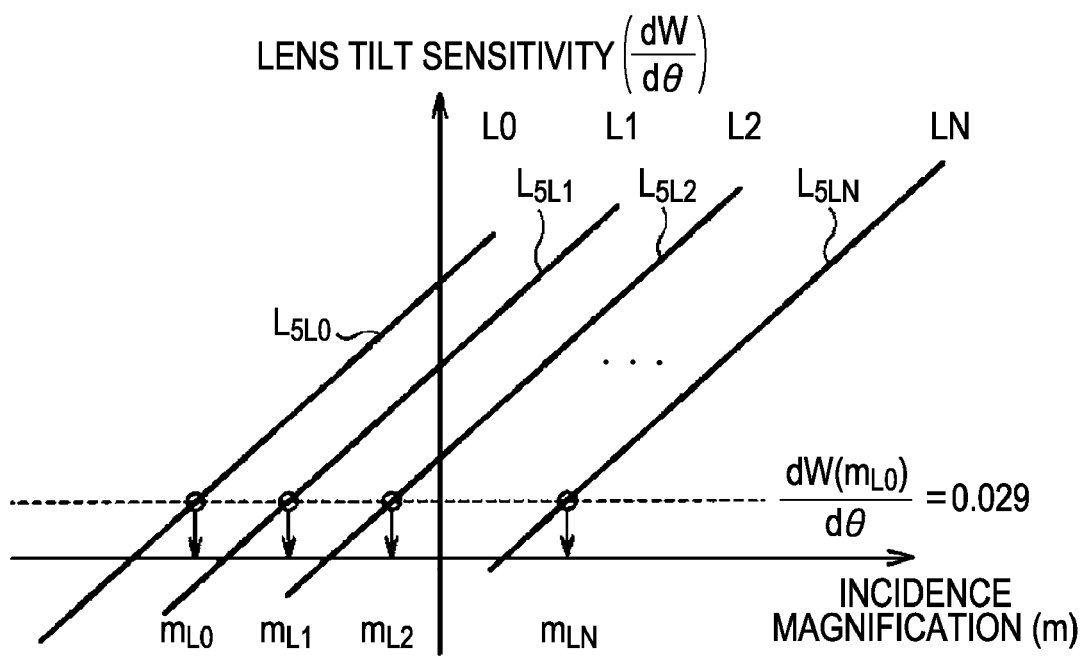
FIG. 13 is a diagram showing a relationship between an incidence magnification and a lens tilt sensitivity of each recording layer in a multi-layer optical disc.

Firstly, the relationship between the lens tilt sensitivity and the correction range in each recording layer of the multi-layer optical disc is shown in FIG. 13. In the case where the lens tilt sensitivity is smaller than a predetermined value, since the coma aberration does not occur at the time of tilting the lens, the coma aberration amount caused by the warpage of the optical disc in the radial direction may not be corrected as described above. Therefore, at least the condition that the equation (14) is satisfied is necessary, and the range of the incidence magnification depends on the thickness of the light transmitting layer (cover layer), so that the range is different according to the thickness thereof. In the equation (14), $m_{LN}$ denotes the incidence magnification of the light beam incident to the objective lens in the case where the light beam is focused on the recording layer having the cover layer having a thickness LN [mm]. In addition, $\Delta W_{LT}(m_{LN})$ denotes the coma aberration [λrms] occurring at the time of tilting the lens by only $\Delta\theta$ corresponding to the incidence magnification $m_{LN}$. In addition, $\Delta W_{LT}(m_{LN})/\Delta\theta$ denotes the corresponding lens tilt sensitivity.

$$|\Delta W_{LT}(m_{LN})/\Delta\theta| \geq 0.029 \quad (14)$$

In other words, in the case where recording and reproducing is performed on the multi-layer optical disc by the optical pickup 3, focused recording layers individually have magnification ranges where the lens tilt correction is performed in order to maintain good quality of recorded and reproduced signals. In addition, by taking into consideration the above premise, the lens tilt correction is performed only in the case where the lens tilt sensitivity of each layer satisfies the equation (14). In other words, as described above, in the case where the lens tilt sensitivity is sensed based on the detection result of the collimator position detecting unit 46, the lens tilt sensitivity is sensed based on the relationship between the lens tilt sensitivity and incidence magnification (position of the collimator) of each layer.

In equation (14), the lower limit of the lens tilt sensitivity is set to 0.029 λrms/deg due to the following reasons. Since the disc tilt sensitivity that is defined by the coma aberration occurring at the time of tilting the optical disc is in proportion to the cover layer thickness of the optical disc, the coma aberration occurring in the case of a large cover layer thickness is large.

In the current BD two-layer optical disc, a layer having a larger cover layer thickness is referred to as an L0 layer, which has a cover layer thickness of 0.100 mm; and a layer having a smaller cover layer thickness is referred to as an L1 layer, which has a cover layer thickness of 0.075 mm. The disc tilt sensitivities are L0=0.110 λrms/deg and L1=0.080 λrms/deg, and the L0 has a higher disc tilt sensitivity. In addition, the disc tilt sensitivity is a value defined by the cover layer thickness and an angle of the light beam, and the angle of the light beam is a value defined by a numerical aperture NA. In the future, multi-layer discs having much higher density are expected to be developed. However, it is predicted that, in the cover layer having larger thickness, the coma aberration occurring sensitivity caused by the tilting is increased, it is vulnerable to the disturbance. Therefore, the number of layers is to be increased, it is expected to be constructed with thin layers having a thickness that is smaller than 0.100 mm. In other words, in the case of having the highest disc tilt sensitivity, even the multi-layer disc may be considered to be constructed with thin layers having a thickness of 0.100 mm. Therefore, In order to correct the coma aberration corresponding to the standard of the disc warpage of the disc on which the recording is performed according to the BD standard, it is necessary for the optical pickup to satisfy at least the following lens tilt sensitivity. The maximum coma aberration caused by the disc warpage of 0.4 deg occurs at the L0 layer, and the occurring coma aberration is 0.4 [deg]×0.110 [λrms/deg]=0.044 λrms. If the condition that the lens tilt sensitivity is necessary to correct the coma aberration in the range that does not exceed the maximum value 1.5 deg of the tilt angle for maintaining the performance of the actuator is considered, the lens tilt sensitivity is equal to or larger than 0.029 [λrms/deg] as shown in the equation (9). The condition is also necessary to be satisfied commonly by the multi-layer optical disc.

Figure 14:
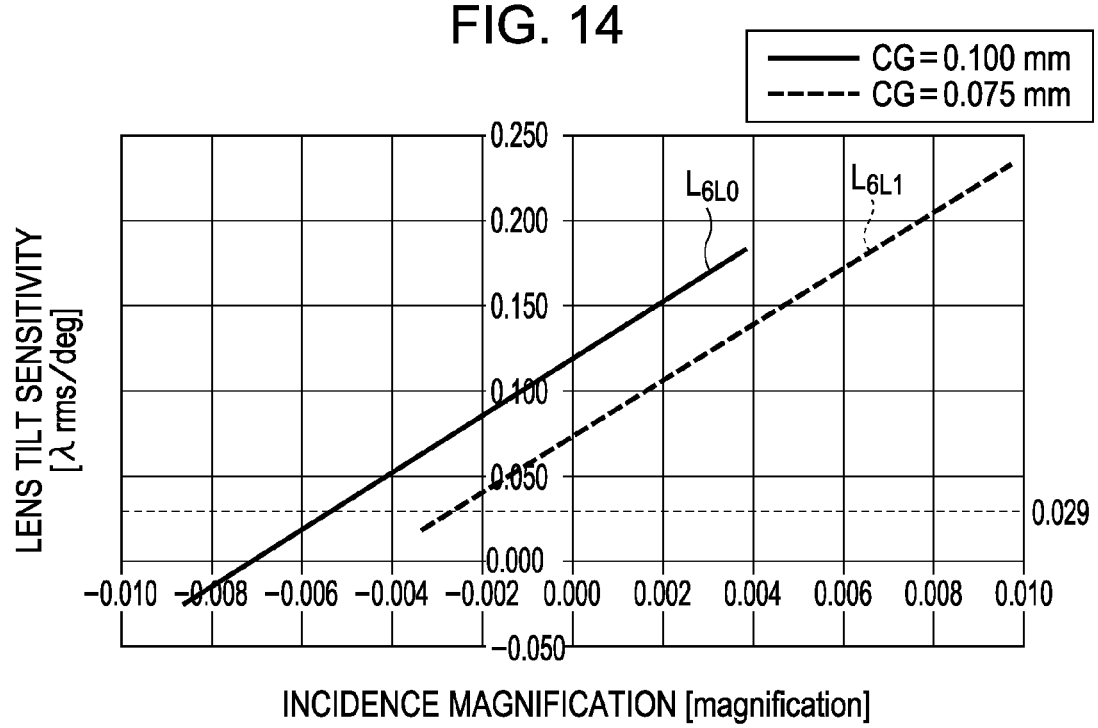
FIG. 14 is a diagram showing a relationship between an incidence magnification and a lens tilt sensitivity of each recording layer in a two-layer optical disc.

A relationship between the lens tilt sensitivity and objective incidence magnification with respect to the two-layer disc of the BD in the case of taking into consideration the use temperature range, use wavelength range, and variation of the original spherical aberration of the optical pickup is shown in Tables 3 and 4 and FIG. 14. In addition, in this case, the wavelength-varying sensitivity is $\beta=0.01200$ [λrms/nm]; the temperature-varying sensitivity is $\alpha=0.00574$ [λrms/deg]; the interlayer-thickness-varying sensitivity is $\gamma=0.00982$ [λrms/m]; and the original spherical aberration is $SA_{org}=\pm0.020$ [λrms]. In addition, in Table 3, the lens tilt sensitivity in the recording layer L1 is listed; and in table 4, lens tilt sensitivity in the recording layer L0 is listed. In addition, in the tables, "temperature [° C.]", "initial LD wavelength λ[nm]", and "cover layer thickness [nm]" are listed. In addition, in the tables, "original spherical aberration [λrms]", "three-order spherical aberration (SA3) occurring amount [λrms]", "incidence magnification", "reciprocal of incidence magnification (1/m)", and "lens tilt (LT) sensitivity [λrms/deg]" are listed. FIG. 14 is a diagram showing Tables 3 and 4. In FIG. 14, the horizontal axis represents an incidence magnification, and the vertical axis represents a lens tilt sensitivity [λrms/deg]. In FIG. 14, $L_{6L0}$ represents a relationship of the lens tilt sensitivity to the incidence magnification in the recording layer L0, and $L_{6L1}$ represents a relationship of the lens tilt sensitivity to the incidence magnification in the recording layer L1.

TABLE 3

| | | | *Lens Tilt Sensitivity (Recording Layer $L_1$) | | | | |
|---|---|---|---|---|---|---|---|
| Temperature [° C.] | Initial LD Wavelength λ [mm] | Cover Layer Thickness [mm] | Original spherical aberration [λrms] | SA3 Occurrence Ratio [λrms] | Incidence Magnification | 1/m | LT Sensitivity [λrms/deg] |
| 0 | 400 | 0.0750 | 0.020 | 0.4037 | 0.0097 | 102.9 | 0.232 |
| 0 | 400 | 0.0750 | 0.000 | 0.3837 | 0.0092 | 108.3 | 0.224 |
| 0 | 405 | 0.0750 | 0.000 | 0.3237 | 0.0078 | 128.3 | 0.201 |
| 10 | 405 | 0.0750 | 0.000 | 0.2663 | 0.0064 | 156.0 | 0.178 |
| 20 | 405 | 0.0750 | 0.000 | 0.2089 | 0.0050 | 198.9 | 0.156 |
| 30 | 405 | 0.0750 | 0.000 | 0.1515 | 0.0036 | 274.2 | 0.133 |
| 40 | 405 | 0.0750 | 0.000 | 0.0941 | 0.0023 | 441.6 | 0.111 |
| 50 | 405 | 0.0750 | 0.000 | 0.0367 | 0.0009 | 1133.2- | 0.088 |
| 60 | 405 | 0.0750 | 0.000 | −0.0208 | −0.0004 | −2250.3 | 0.067 |
| 70 | 405 | 0.0750 | 0.000 | −0.0782 | −0.0017 | −597.5 | 0.047 |
| 70 | 410 | 0.0750 | 0.000 | −0.1382 | −0.0030 | −338.0 | 0.026 |
| 70 | 410 | 0.0750 | −0.020 | −0.1582 | −0.0034 | −295.2 | 0.019 |

TABLE 4

| | | | | *Lens Tilt Sensitivity (Recording Layer $L_0$) | | | |
|---|---|---|---|---|---|---|---|
| Temperature [° C.] | Initial LD Wavelength λ [nm] | Cover Layer Thickness [mm] | Original spherical aberration [λrms] | SA3 Occurrence Ratio [λrms] | Incidence Magnification | 1/m | LT Sensitivity [λrms/deg] |
| 0 | 400 | 0.1000 | 0.020 | 0.1582 | 0.0038 | 262.6 | 0.182 |
| 0 | 400 | 0.1000 | 0.000 | 0.1382 | 0.0033 | 300.6 | 0.174 |
| 0 | 405 | 0.1000 | 0.000 | 0.0781 | 0.0019 | 531.5 | 0.150 |
| 10 | 405 | 0.1000 | 0.000 | 0.0207 | 0.0005 | 2001.6 | 0.127 |
| 20 | 405 | 0.1000 | 0.000 | −0.0367 | −0.0008 | −1274.0 | 0.105 |
| 30 | 405 | 0.1000 | 0.000 | −0.0941 | −0.0020 | −496.5 | 0.085 |
| 40 | 405 | 0.1000 | 0.000 | −0.1515 | −0.0032 | −308.3 | 0.065 |
| 50 | 405 | 0.1000 | 0.000 | −0.2089 | −0.0045 | −223.6 | 0.044 |
| 60 | 405 | 0.1000 | 0.000 | −0.2663 | −0.0057 | −175.4 | 0.024 |
| 70 | 405 | 0.1000 | 0.000 | −0.3237 | −0.0069 | −144.3 | 0.004 |
| 70 | 410 | 0.1000 | 0.000 | −0.3837 | −0.0082 | −121.7 | −0.018 |
| 70 | 410 | 0.1000 | −0.020 | −0.4037 | −0.0086 | −115.7 | −0.025 |

As shown in FIG. 14 and Tables 3 and 4, in the multi-layer optical disc, the relationship between the incidence magnification and the lens tilt sensitivity is different between the recording layers L0 and L1.

Hereinafter, the range of the incidence magnification of each recording layer of the multi-layer optical disc, where the lens tilt sensitivity is equal to or larger than a predetermined value is described. The L0 layer having a cover layer thickness of 0.100 mm and the L1 layer having a cover layer thickness of 0.075 mm have different lens tilt sensitivities even in the case where the incidence magnification of the objective lens is the same. Since the equation (14) is satisfied, the incidence magnification is expressed by the following equations (15) and (16). In the case where each of the recording layers L0 and L1 is focused, a quality of signal can be more effectively maintained by performing the lens tilt correction in the range that satisfies the equations (15) and (16).

$$m_{L0} > -0.00540 \quad (15)$$

$$m_{L1} > -0.00276 \quad (16)$$

If the aforementioned equations (15) and (16) are satisfied, the lens tilt correction can be performed. Furthermore, the incidence magnification may be derived by using the following instructions. Herein, the incidence magnification that can be used to more accurately perform the lens tilt correction in each recording layer is examined. According to the examination hereinafter, the lens tilt correction can be performed in a wider range than the aforementioned equations (15) and (16). In other words, it is possible to further reduce the coma aberration. The threshold in the equation (9) or the equation (14) is a value calculated in the L0 layer where the disc tilt sensitivity is in maximum. In the case of the L1 layer having thinner cover layer, since the disc tilt sensitivity is smaller than that of the L0 layer, the coma aberration caused by the radial direction disc warpage of 0.4 deg is small. The coma aberration of each of the recording layers L0 and L1 can be calculated by using the following equations (17) and (18).

L0 Layer: 0.4 [deg]×0.110 [λrms/deg]=0.044 [λrms] (17)

L1 Layer: 0.4 [deg]×0.080 [λrms/deg]=0.032 [λrms] (18)

Figure 15:
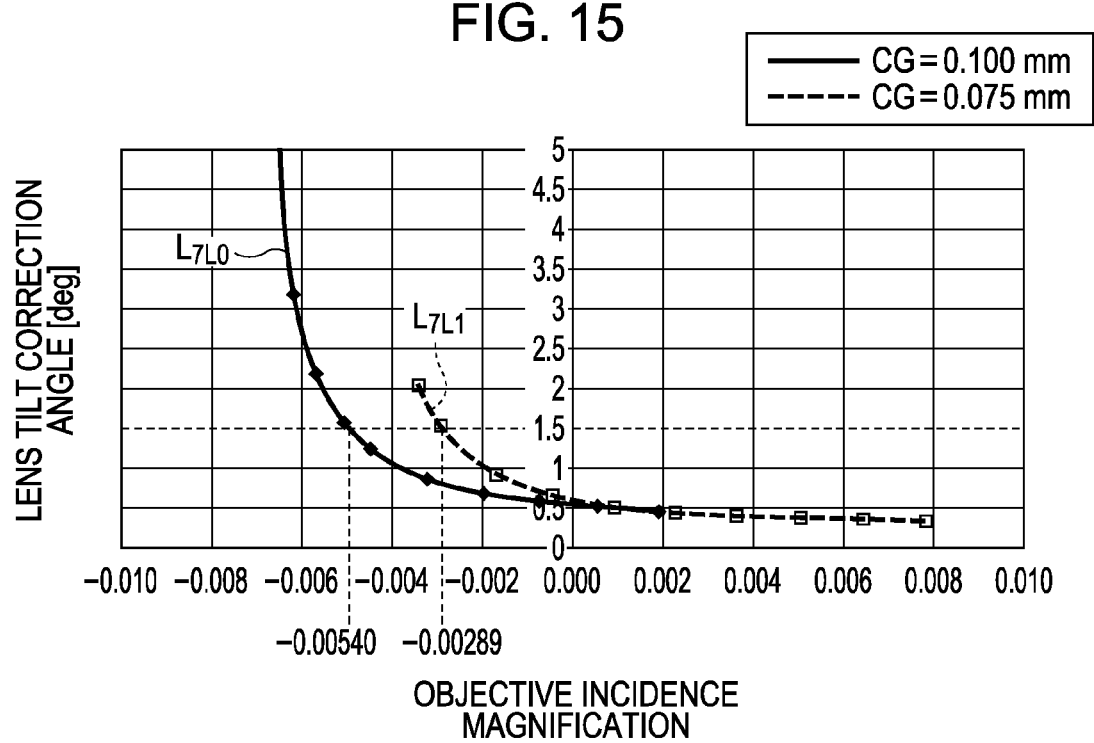
FIG. 15 is a diagram showing a relationship between an incidence magnification and a lens tilt correction angle at the time of coma aberration correction of each recording layer, which occurs as a maximum warpage of the disc defined according to a disc format, in a two-layer optical disc.

In the case where the coma aberration is corrected by the lens tilt in each recording layer, there is the relationship shown in FIG. 15 that the sensitivity is changed with respect to each incidence magnification. In FIG. 15, the horizontal axis represents the incidence magnification, and the vertical axis represents the lens tilt correction angle. In addition, $L_{7L0}$ represents a relationship of the incidence magnification used to correct the coma aberration of 0.044 λrms in the recording layer L0 and the lens tilt correction angle. In addition, $L_{7L1}$ represents a relationship of the incidence magnification used to correct the coma aberration of 0.032 arms in the recording layer L1 and the lens tilt correction angle.

With respect to each of the recording layers L0 and L1, if the characteristics as an actuator are necessary to be maintained and if the tilt correctable angle is necessary to be in a range not exceeding the $\theta_{ActMax}$=1.5 deg, the relationship of the following equations (19) and (20) are calculated.

$$m_{L0} > -0.00540 \quad (19)$$

$$m_{L1} > -0.00289 \quad (20)$$

According to the aforementioned examination, in the case where each of the recording layers is focused, a quality of a signal can be more effectively maintained by performing the lens tilt correction in the range that satisfies the equations (19) and (20). In addition, since the range of the equation (20) is wider than that of the equation (16), the coma aberration can be further reduced in comparison with the aforementioned case. This is because, it can be understood according to the aforementioned examination that the lens tilt sensitivity is included up to the range of the equation (20) to the extent that the lens tilt correction can be performed. In other words, as described by using the equations (19) and (20), the control unit 50 that is the lens tilt sensitivity sensing unit may be configured to determine based on the relationship of the lens tilt sensitivity to the incidence magnification of each recording layer whether or not to have a predetermined lens tilt sensitivity. According to the configuration, the coma aberration correction of the multi-layer optical disc can be implemented in a wider range, so that good recording and reproducing characteristics can be obtained.

In other words, by comparing the equations (15) and (16) with the equations (19) and (20), the correctable range of the L1 layer is wider. This denotes that, since the coma aberration occurring in the L1 layer having a low disc tilt sensitivity is small in comparison with the L0 layer, the sensitivity necessary for the correction is low. In other words, since the equations (15) and (16) satisfies the ranges of the equations (19) and (20), signals can be read with good quality of signal and with invulnerability to disturbance and perturbation by performing the lens tilt correction in the range of the aforementioned equation (14).

In this manner, in the case where the lens tilt sensitivity is low, the correction is not available, so that the coma aberration is allowed to remain. On the other hand, in the case of having large incidence magnification like the ranges defined by the equations (15), (16), (19), and (20), the lens tilt correction is available, so that the lens tilt is applied at the angle so that the best quality of signal is obtained. Accordingly, the recording and reproducing performance of the two-layer optical disc can be improved.

Hereinafter, a tilt correction method for suppressing the coma aberration in the case of performing recording and reproducing with respect to a high density recording type optical disc 2 such as BD is described with reference to flowcharts shown in FIGS. 16 to 18. Herein, methods of sensing the lens tilt sensitivity and determining the range for the lens tilt correction are mainly described by using three examples of the following Sections 6 to 8.

6. Tilt Correction Process

First Example

Firstly, a method of checking a driving amount of the collimator lens 35 by using the collimator position detecting unit 46 such as a position sensor is described as a first example of the tilt adjusting method of the optical pickup 3. Since the lens tilt sensitivity and the incidence magnification in each recording layer have one-to-one correspondence to the position of the collimator, the method of checking the position of the collimator lens 35 is an excellent method in order to sense the lens tilt sensitivity. More specifically, the optical disc apparatus 1 including the aforementioned optical pickup 3 performs the recording and reproducing method shown in FIG. 16.

In Step S1, the optical disc 2 is mounted on the disc mounting unit of the optical disc apparatus 1. In Step S2, the system controller 7 drives the laser control unit 21 so as for the light beam to be emitted from the light source unit 31. The system controller 7 drives the spindle motor 4 by using the servo control unit 9 to rotate and manipulate the optical disc 2 mounted on the disc mounting unit. In Step S3, the optical pickup 3 and the disc type determination unit 22 senses the optical disc 2.

In Step S4, the control unit 50 controls the collimator lens driving unit 45 according to the control of the system controller 7 to move the collimator lens 35 to a predetermined position. At this time, the collimator lens 35 is moved to a reference position according to the type of the optical disc 2 detected by the disc type determination unit 22. In addition, the control unit 50 also performs the spherical aberration correction by finely moving the collimator lens 35 in the optical axial direction by using the collimator lens driving unit 45. More specifically, the control unit 50 moves the collimator lens 35 in such a direction that the quality of the RF signal detected by the light detector 39 is improved, that is, in such a direction that the detected jitter amount of the RF signal detected by the light detector 39 is minimized.

In Step S5, the servo control unit 9 performs the focus control by driving the objective lens driving unit 49 based on the focus error signal to move the objective lens 34 in the focus direction. In Step S6, the control unit 50 determines the lens tilt correction amount so that the coma aberration can be reduced with respect the warpage of the optical disc 2. The control unit 50 drives the objective lens driving unit 49 to move the objective lens 34 in the tilt direction. More specifically, after the spherical aberration correction, the control unit 50 tilts the objective lens 34 in the direction that the quality of the RF signal is improved. In other words, the control unit 50 detects the jitter amount of the RF signal detected by the light detector 39 and tilts the objective lens 34 in the direction that the jitter amount is minimized. In Step S7, the servo control unit 9 performs the tracking control by driving the objective lens driving unit 49 based on the tracking error signal to move the objective lens 34 in the tracking direction.

In Step S8, the optical pickup 3 starts recording or reproducing the information signals with respect to the optical disc 2. In the optical pickup 3, particularly, the circumferential portion of the objective lens 34, the internal temperature of the case is increased due to the continuous operations of the optical disc apparatus 1 and the optical pickup 3. In addition, in some cases, the change in temperature may also occur according to use conditions. At this time, the spherical aberration of the plastic objective lens 34 is changed according to the change in shape or the change in refractive index associated with the change in temperature. In order to reduce the spherical aberration, the control unit 50 drives the collimator lens driving unit 45 to move the collimator lens 35. In Step S9, the collimator position detecting unit 46 detects the position of the collimator lens 35. The control unit 50, as a lens tilt sensitivity sensing unit, senses the incidence magnification of the light beam incident to the objective lens 34 based on the position of the collimator lens 35.

In Step S10, the control unit 50 determines based on the relationship between the incidence magnification and the lens tilt sensitivity whether or not the lens tilt sensitivity is in a lens tilt correction prohibited range. In other words, the control unit 50 determines based on the sensed incidence magnification whether or not the obtained lens tilt sensitivity is equal to or larger than a predetermined lens tilt sensitivity. At the time of the determination, the control unit 50 may compare the sensed incidence magnification with the incidence magnification corresponding to the predetermined lens tilt sensitivity. In addition, the control unit 50 may calculate the lens tilt sensitivity from the sensed incidence magnification and compare the calculated lens tilt sensitivity with the predetermined lens tilt sensitivity. In addition, in the case where the optical disc is a multi-layer optical disc, the coma aberration can be more effectively reduced by determining based on the relationship of the lens tilt sensitivity to the incidence magnification of each recording layer whether or not the lens tilt sensitivity is in the lens tilt correction prohibited range, as described above. In Step S10, in the case where the sensed lens tilt sensitivity is equal to or smaller than a predetermined lens tilt sensitivity, it is determined that the lens tilt sensitivity is in a lens tilt correction prohibited range, and the procedure proceeds to Step S11. On the other hand, in the case where the sensed lens tilt sensitivity is equal to or larger than a predetermined lens tilt sensitivity, it is determined that the lens tilt sensitivity is not in the lens tilt correction prohibited range, and the procedure proceeds to Step S12.

In Step S11, the control unit 50 corrects the lens tilt correction amount so that the coma aberration occurring according to the change in temperature is reduced and drives the objective lens driving unit 49 to move the objective lens 34 in the tilt direction. More specifically, the control unit 50 tilts the objective lens 34 in the direction that the quality of the RF signal is improved. In other words, the control unit 50 detects the jitter amount of the RF signal detected by the light detector 39 and tilts the objective lens 34 in the direction that the jitter amount is minimized. Herein, the coma aberration occurring associated with the change in temperature denotes a coma aberration occurring associated with the aforementioned change in shape or refractive index of the plastic objective lens or the change in incidence magnification for reducing the spherical aberration associated with the aforementioned change in temperature.

In Step S12, the control unit 50 maintains the lens tilt correction amount. In other words, the control unit 50 controls the objective lens driving unit 49 not to change the tilt direction moving position of the objective lens 34.

In Step S13, the system controller 7 determines whether or not the recording or reproducing operation is ended. Herein, in the case where the recording or reproducing operation is determined to be ended, the procedure proceeds to Step S14. On the other hand, in the case where the recording or reproducing operation is determined not to be ended, the system controller 7 returns to Step S9.

In Step S14, the laser control unit 21 stops the emitting of the light beam from the light source unit 31, and the servo control unit 9 stops the driving of the spindle motor 4.

According to the process shown in FIG. 16, the correction is performed only in the range having the lens tilt sensitivity, so that recording and reproducing can be performed with good quality of signal and with invulnerability to disturbance and perturbation. In other words, in general, in order to correct the spherical aberration caused by the cover layer thickness, the optical pickup corresponding to BD or the like includes a collimator driving unit that changes the magnification. Similarly, with respect to the spherical aberration occurring in a plastic lens according to the change in environment temperature and the spherical aberration occurring according to the change in wavelength, the magnification spherical aberration is allowed to occur by driving the collimator lens in the optical axial direction, so that a system of optimizing the quality of signal is provided. Herein, since the incidence magnification of the objective lens is changed due to the driving of the collimator lens, there is a problem in that the lens tilt sensitivity is changed, as described above. As described above, the optical pickup 3 is provided with the collimator position detecting unit 46 that senses the position of the collimator lens. In addition, as described in the process shown in FIG. 16, in the case where the collimator lens is moved associated with the change in temperature, the position is checked; the incidence magnification of the light beam incident to the objective lens is specified; and it is determined whether or not it is within the range where the lens tilt correction is to be performed. In a tilt adjusting method using the optical pickup 3 according to an embodiment of the present invention, similarly to Step S10, it is checked whether or not the lens tilt sensitivity is in the lens tilt correction prohibited range, and the correction is performed only in the range having the lens tilt sensitivity, so that recording and reproducing can be performed with good quality of signal and with invulnerability to disturbance and perturbation.

In this manner, the optical pickup 3 according to an embodiment of the present invention includes the collimator lens driving unit 45 and the collimator position detecting unit 46. In addition, the control unit 50, as a lens tilt sensitivity sensing unit, determines based on the relationship of the incidence magnification of the light beam incident to the objective lens 34 to the position of the collimator lens 35 and the relationship of the lens tilt sensitivity to the incidence magnification whether or not to have the predetermined lens tilt sensitivity. In the optical pickup 3 having the configuration, the coma aberration can be suitably reduced in the use environment range by the plastic objective lens 34, so that good recording and reproducing characteristics can be implemented.

7. Tilt Correction Process

Second Example

Next, a method of checking a change in environment temperature by using the temperature detecting device 48 is described as a second example of the tilt adjusting method of the optical pickup 3. More specifically, the optical disc apparatus 1 including the aforementioned optical pickup 3 performs the recording and reproducing method shown in FIG. 17.

In Step S21, the optical disc 2 is mounted on the disc mounting unit of the optical disc apparatus 1. In Step S22, the system controller 7 drives the laser control unit 21 so as for the light beam to be emitted from the light source unit 31. The system controller 7 drives the spindle motor 4 by using the servo control unit 9 to rotate and manipulate the optical disc 2 mounted on the disc mounting unit. In Step S23, the optical pickup 3 and the disc type determination unit 22 senses the optical disc 2.

In Step S24, the control unit 50 controls collimator lens driving unit 45 according to the control of the system controller 7 to move the collimator lens 35 to a predetermined position. In addition, the control unit 50 also performs the spherical aberration correction by finely moving the collimator lens 35 in the optical axial direction by using the collimator lens driving unit 45. In addition, the detailed process in Step S24 is the same as that of the aforementioned Step S4, and thus, the detailed description is omitted.

In Step S25, the servo control unit 9 performs the focus control by driving the objective lens driving unit 49 based on the focus error signal to move the objective lens 34 in the focus direction. In Step S26, the control unit 50 determines the lens tilt correction amount so that the coma aberration can be reduced with respect to the warpage of the optical disc 2. The control unit 50 drives the objective lens driving unit 49 to move the objective lens 34 in the tilt direction. The detailed process thereof is the same as that of the aforementioned Step S6. In Step S27, the servo control unit 9 performs the tracking control by driving the objective lens driving unit 49 based on the tracking error signal to move the objective lens 34 in the tracking direction.

In Step S28, the optical pickup 3 starts recording or reproducing the information signals with respect to the optical disc 2. As described in the aforementioned Step S8, there is a case where the change in temperature may occur due to the operations of the optical pickup 3, and in this case, the collimator lens 35 is moved. In Step S29, the temperature detecting device 48 detects the environment temperature of the circumferential portion of the objective lens 32. In addition, the control unit 50, as a lens tilt sensitivity sensing unit, senses the lens tilt sensitivity by regularly acquiring the current temperature from the temperature signal of the temperature detecting device 48.

In Step S30, the control unit 50 determines based on the relationship of the lens tilt sensitivity to the temperature whether or not the lens tilt sensitivity is in a lens tilt correction prohibited range. In other words, the control unit 50 determines based on the sensed temperature whether or not the lens tilt sensitivity is equal to or larger than a predetermined lens tilt sensitivity. In Step S30, in the case where the lens tilt sensitivity based on the sensed temperature is equal to or smaller than the predetermined lens tilt sensitivity, it is determined that the lens tilt sensitivity is in a lens tilt correction prohibited range, and the procedure proceeds to Step S31. On the other hand, in the case where the lens tilt sensitivity based on the sensed temperature is equal to or larger than the predetermined lens tilt sensitivity, it is determined that the lens tilt sensitivity is not in the lens tilt correction prohibited range, and the procedure proceeds to Step S32.

In Step S31, the control unit 50 corrects the lens tilt correction amount so that the coma aberration occurring according to the change in temperature is reduced and drives the objective lens driving unit 49 to move the objective lens 34 in the tilt direction. More specifically, the control unit 50 tilts the objective lens 34 in the direction that the quality of the RF signal is improved. In other words, the control unit 50 detects the jitter amount of the RF signal detected by the light detector 39 and tilts the objective lens 34 in the direction that the jitter amount is minimized. Herein, the coma aberration occurring associated with the change in temperature denotes a coma aberration occurring associated with the aforementioned change in shape or refractive index of the plastic objective lens 34 or the change in incidence magnification for reducing the spherical aberration associated with the aforementioned change in temperature.

In Step S32, the control unit 50 maintains the lens tilt correction amount. In other words, the control unit 50 controls the objective lens driving unit 49 not to change the tilt direction moving position of the objective lens 34.

In Step S33, the system controller 7 determines whether or not the recording or reproducing operation is ended. Herein, in the case where the recording or reproducing operation is determined to be ended, the procedure proceeds to Step S34. On the other hand, in the case where the recording or reproducing operation is determined not to be ended, the system controller 7 returns to Step S29.

In Step S34, the laser control unit 21 stops the emitting of the light beam from the light source unit 31, and the servo control unit 9 stops the driving of the spindle motor 4.

According to the process shown in FIG. 17, the correction is performed only in the range having the lens tilt sensitivity, so that recording and reproducing can be performed with good quality of signal and with invulnerability to disturbance and perturbation. In other words, in general, similarly to the optical pickup for a BD on which the plastic objective lens is mounted, since the spherical aberration amount occurring in the objective lens according to the change in temperature is not negligible, so that a system of driving the collimator lens according to the temperature is provided. Herein, in the optical pickup 3, since the occurring spherical aberration amount can be perceived by monitoring the circumferential temperature of the objective lens, so that an amount of driving the collimator lens, which is used to correct the spherical aberration amount, can be perceived. As a result, the objective lens tilt sensitivity at the temperature can be perceived from the relationship between the amount of driving the collimator lens and the incidence magnification, so that the lens tilt correction range can be perceived. In a tilt adjusting method using the optical pickup 3 according to an embodiment of the present invention shown in FIG. 17, similarly to the case of performing the collimator position sensing shown in FIG. 16, it is checked by temperature sensing whether or not the lens tilt sensitivity is in the lens tilt correction prohibited range similarly to Step S30. Accordingly, the correction is performed only in the range having the lens tilt sensitivity, so that recording and reproducing can be implemented with good quality of signal and with invulnerability to disturbance and perturbation.

In this manner, the optical pickup 3 according to an embodiment of the present invention includes the temperature detecting device 48 as a temperature detecting unit that detects the circumferential temperature of the objective lens 34. In addition, the control unit 50, as a lens tilt sensitivity sensing unit, determines based on the relationship between the lens tilt sensitivity to the temperature whether or not to have the predetermined lens tilt sensitivity. In the optical pickup 3 having the configuration, the coma aberration can be suitably reduced in the use environment range by the plastic objective lens 34, so that good recording and reproducing characteristics can be implemented.

8. Tilt Correction Process

Third Example

Next, a method of checking a changing signal amount caused by the tilt wobbling by using the light detector 39 is described as a third example of the tilt adjusting method of the optical pickup 3.

More specifically, the optical disc apparatus 1 including the aforementioned optical pickup 3 performs the recording and reproducing method shown in FIG. 18.

In Step S41, the optical disc 2 is mounted on the disc mounting unit of the optical disc apparatus 1. In Step S42, the system controller 7 drives the laser control unit 21 so as for the light beam to be emitted from the light source unit 31. The system controller 7 drives the spindle motor 4 by using the servo control unit 9 to rotate and manipulate the optical disc 2 mounted on the disc mounting unit. In Step S43, the optical pickup 3 and the disc type determination unit 22 senses the optical disc 2.

In Step S44, the control unit 50 controls collimator lens driving unit 45 according to the control of the system controller 7 to move the collimator lens 35 to a predetermined position. In addition, the control unit 50 also performs the spherical aberration correction by finely moving the collimator lens 35 in the optical axial direction by using the collimator lens driving unit 45. In addition, the detailed process in Step S44 is the same as that of the aforementioned Step S4, and thus, the detailed description is omitted.

In Step S45, the servo control unit 9 performs the focus control by driving the objective lens driving unit 49 based on the focus error signal to move the objective lens 34 in the focus direction. In Step S46, the control unit 50 determines the lens tilt correction amount so that the coma aberration can be reduced with respect to the warpage of the optical disc 2. The control unit 50 drives the objective lens driving unit 49 to move the objective lens 34 in the tilt direction. The detailed process thereof is the same as that of the aforementioned Step S6. In Step S47, the servo control unit 9 performs the tracking control by driving the objective lens driving unit 49 based on the tracking error signal to move the objective lens 34 in the tracking direction.

In Step S48, the optical pickup 3 starts recording or reproducing the information signals with respect to the optical disc 2. As described in the aforementioned Step S8, there is a case where the change in temperature may occur due to the operations of the optical pickup 3, and in this case, the collimator lens 35 is moved. In Step S49, the control unit 50 and light detector 39 detects the changing signal amount at the time of applying the tilt wobbling operation to the objective lens 34. The detected changing signal amount may be, for example, the jitter amount at the time of the aforementioned tilt wobbling operation. The detected changing signal amount may be, for example, the RF signal at the time of the aforementioned tilt wobbling operation. Hereinafter, as an example of detecting the changing signal amount, the example of the example of detecting the change in jitter amount is described. The control unit 50, as a lens tilt sensitivity sensing unit, senses the lens tilt sensitivity by performing the tilt wobbling operation by using an unoccupied time interval of the recording and reproducing according to the use of a buffer or the like.

Figure 19A:
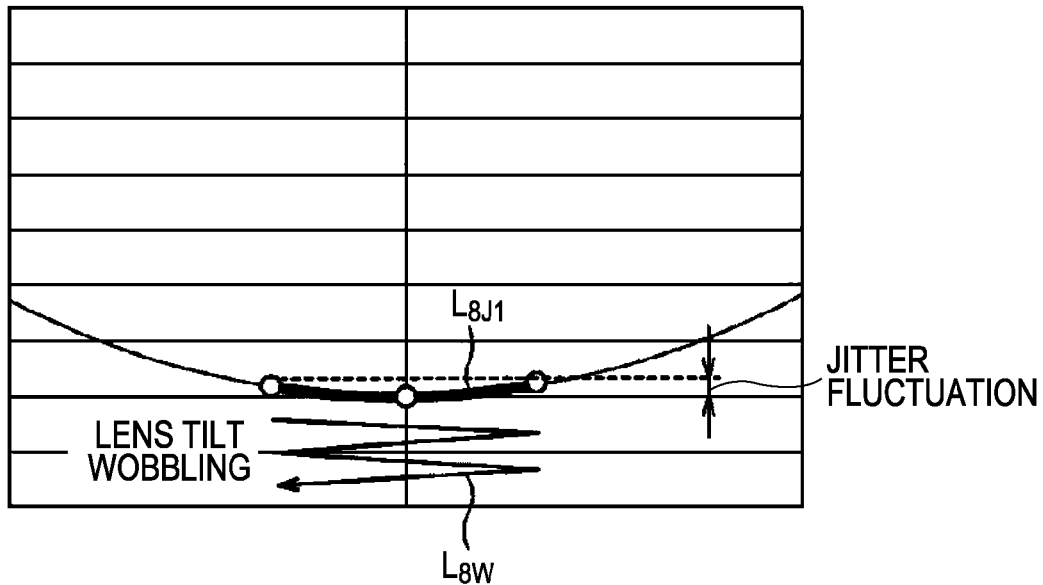
FIG. 19A shows a changing jitter amount in the case where the tilt sensitivity does not exist.
Figure 19B:
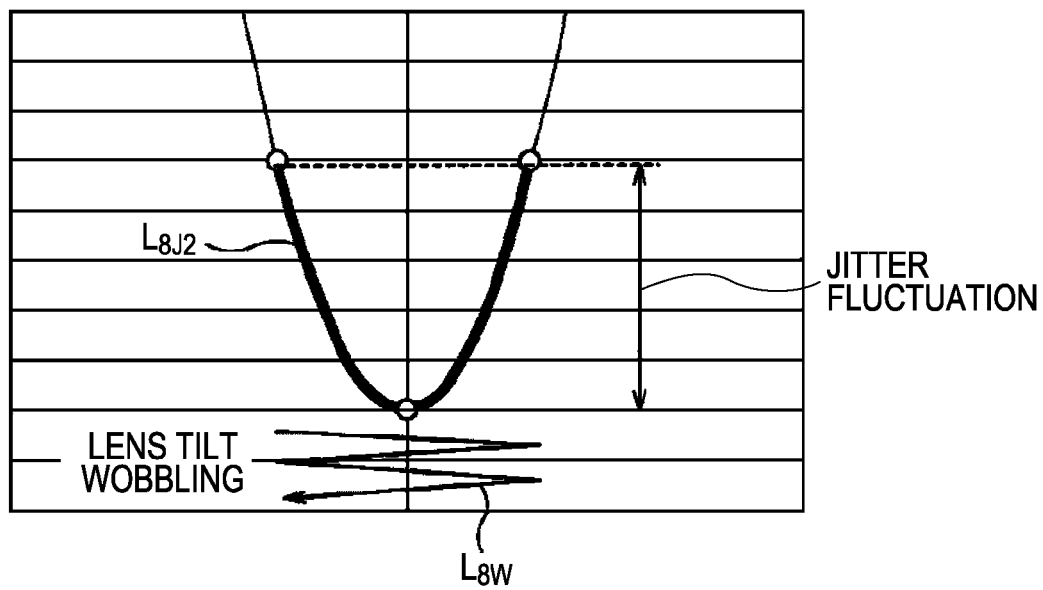
FIG. 19B shows a changing jitter amount in the case where the tilt sensitivity exists.

In Step S50, the control unit 50 determines based on the relationship of the lens tilt sensitivity to the jitter amount at the time of applying the tilt wobbling operation whether or not the lens tilt sensitivity is in a lens tilt correction prohibited range. In other words, the control unit 50 determines based on the change in sensed jitter amount whether or not the obtained lens tilt sensitivity is equal to or larger than a predetermined lens tilt sensitivity. More specifically, for example, as shown in FIG. 19A, the change in jitter amount indicated by $L_{8J1}$ detected by the light detector 39 is sensed at the time of applying the tilt wobbling operation indicted by $L_{8W}$ by the control unit 50. In this case, since the changing jitter amount is small, the control unit 50 determines that the lens tilt sensitivity is equal to or smaller than the predetermined lens tilt sensitivity. In addition, as shown in FIG. 19B, the change in jitter amount indicated by $L_{8J2}$ detected by the light detector 39 is sensed at the time of applying the tilt wobbling operation indicted by $L_{8W}$ by the control unit 50. In this case, since the changing jitter amount is large, the control unit 50 determines that the lens tilt sensitivity is equal to or larger than the predetermined lens tilt sensitivity. The threshold of the sensed changing jitter amount is the same as described above. In Step S50, in the case where the lens tilt sensitivity based on the change in sensed jitter amount is determined to be equal to or smaller than the predetermined lens tilt sensitivity, it is determined that the lens tilt sensitivity is in the lens tilt correction prohibited range, and the procedure proceeds to Step S51. On the other hand, in the case where the lens tilt sensitivity based on the change in sensed jitter amount is determined to be equal to or larger than the predetermined lens tilt sensitivity, it is determined that the lens tilt sensitivity is not in the lens tilt correction prohibited range, and the procedure proceeds to Step S52.

In Step S51, the control unit 50 corrects the lens tilt correction amount so that the coma aberration occurring according to the change in temperature is reduced and drives the objective lens driving unit 49 to move the objective lens 34 in the tilt direction. More specifically, the control unit 50 tilts the objective lens 34 in the direction that the quality of the RF signal is improved. In other words, the control unit 50 detects the jitter amount of the RF signal detected by the light detector 39 and tilts the objective lens 34 in the direction that the jitter amount is minimized. Herein, the coma aberration occurring associated with the change in temperature denotes a coma aberration occurring associated with the aforementioned change in shape or refractive index of the plastic objective lens or the change in incidence magnification for reducing the spherical aberration associated with the aforementioned change in temperature.

In Step S52, the control unit 50 maintains the lens tilt correction amount. In other words, the control unit 50 controls the objective lens driving unit 49 not to change the tilt direction moving position of the objective lens 34.

In Step S53, the system controller 7 determines whether or not the recording or reproducing operation is ended. Herein, in the case where the recording or reproducing operation is determined to be ended, the procedure proceeds to Step S54. On the other hand, in the case where the recording or reproducing operation is determined not to be ended, the system controller 7 returns to Step S49.

In Step S54, the laser control unit 21 stops the emitting of the light beam from the light source unit 31, and the servo control unit 9 stops the driving of the spindle motor 4.

According to the process shown in FIG. 18, the correction is performed only in the range having the lens tilt sensitivity, so that recording and reproducing can be performed with good quality of signal and with invulnerability to disturbance and perturbation. In other words, in general, in the optical pickup, in the case where there is a margin in the recording reproducing multiple-speed, the recording and reproducing are performed with a multiple-speed higher than the recording reproducing multiple-speed set by a user. For example, in a system, in the case of the reproducing, information is read out from a disc in advance of the reproducing point, and the information is stored in a buffer. At a suitable timing, the information is reproduced. Therefore, the information in the outer circumferential portion of the optical disc can be read earlier than the real reproducing time. The lens tilt sensitivity at the current environment temperature can be perceived by using an unoccupied time through the following method. In the case where the tilt wobbling is added to the objective lens 34 by the objective lens driving unit 49 in the state that the focus servo is applied, if the lens tilt sensitivity exists, the coma aberration occurs according to the tilt amount, the RF signal level is changed. On the contrary, if the lens tilt sensitivity does not exist, the coma aberration does not occur without the lens tilt, the RF signal level is not almost changed. In addition, in the case where the tracking servo is applied and the tilt wobbling is applied, if the lens tilt sensitivity exists, the jitter deteriorates; and if the lens tilt sensitivity does not exist, the jitter is not changed. In the optical pickup 3, the change in the RF signal level or the change in jitter amount is sensed, and it can be determined whether or not the lens tilt sensitivity exists. In a tilt adjusting method according to the third example using the optical pickup 3 according to an embodiment of the present invention, similarly to Step S50, it is checked whether or not the lens tilt sensitivity is in the lens tilt correction prohibited range, and the correction is performed only in the range having the lens tilt sensitivity, so that recording and reproducing can be performed with good quality of signal and with invulnerability to disturbance and perturbation.

In this manner, the optical pickup 3 according to an embodiment of the present invention includes the lens tilt sensitivity sensing unit that determines based on the change in jitter sensed at the time of applying the tilt wobbling operation or the change amount in signal such as the change in RF signal whether or not to have the predetermined lens tilt sensitivity. In the optical pickup 3 having the configuration, the coma aberration can be suitably reduced in the use environment range by the plastic objective lens 34, so that good recording and reproducing characteristics can be implemented.

In addition, in the examples shown in FIGS. 16 to 18, the cases of performing the recording and reproducing on the first optical disc 11 are described. However, the aforementioned processes can be adapted to the cases of performing the recording and reproducing on the second and third optical discs 12 and 13. In addition, in the cases of the second and third optical discs 12 and 13, the processes shown in FIGS. 16 to 18 may not be performed. In addition, an embodiment of the present invention can be adapted to a recording apparatus or a reproducing apparatus. In addition, an embodiment of the present invention can be adapted to a recording and/or reproducing apparatus dedicated to the first optical disc 11.

In the optical pickup 3 according to an embodiment of the present invention, an inexpensive plastic objective lens 34 having a high productivity is used, so that mass productivity and light weight can be implemented, and a good quality of signal can be obtained even in the case where the temperature is changed due to the plastic lens having a large change in physical property. In addition, according to the optical pickup 3, a specific design change of the objective lens 34 is not necessary. The optical pickup is formed in the same design center as that for the current glass lens, and good aberration correction can be performed by using the same. In addition, according to the optical pickup 3, unlike the assembling method in the related art in which the performance is difficult to maintain due to the change in lens tilt sensitivity, the assembling adjusting method and the lens tilt correction range are optimized, so that the optical pickup can be used even in the current use environment. In addition, according to the optical pickup 3, a strict coma aberration standard for the objective lens or a strict coma aberration standard for the optical part of the pickup fixed optic system is not necessary, and a strict assembling accuracy for the optical pickup is not necessary, so that there is no additional increase in cost. According to the optical pickup 3, a plastic objective lens can be used instead of an expensive glass lens of the related art, so that the optical pickup can be produced at low cost. According to the optical pickup 3, since the original coma aberration is not necessary to be canceled, the initial lens assembling and adjusting method can be implemented by a simple adjusting method, where the lens is initially assembled to be flat, and good aberration correction can be performed.

In other words, in the optical pickup 3 according to an embodiment of the present invention, the objective lens is made of a plastic, so that improved mass productivity and light weight can be implemented. In addition, the configuration is made by taking into consideration the change in the lens tilt sensitivity, so that the compensation of the coma aberration can be performed even in the case where the environment temperature is changed. Therefore, in the optical pickup 3, mass productivity and light weight can be implemented, and good recording and reproducing characteristics can be implemented by performing good aberration correction.

In addition, the optical disc apparatus 1 according to an embodiment of the present invention includes an optical pickup that records and/or reproduces information signals by irradiating a light beam on an optical disc 2 that is driven to rotate, and the aforementioned optical pickup 3 is used as the optical pickup. Therefore, in the optical disc apparatus 1, mass productivity and light weight can be implemented, and good recording and reproducing characteristics can be implemented by performing good aberration correction.

The present application contains subject matter related to that disclosed in Japanese Priority Patent Application JP 2008-317114 filed in the Japan Patent Office on Dec. 12, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
a light source to emit a light beam having a predetermined wavelength;
a plastic objective lens to condense the light beam emitted from the light source on an optical disc;
a light detector to receive the light beam reflected by the optical disc and detects the light beam;
an objective lens driving unit to drive the plastic objective lens in a tilt direction to tilt the plastic objective lens; and
a lens tilt sensitivity sensing unit to sense a lens tilt sensitivity that is denoted by $\Delta W_{LT}/\Delta\theta$, in which $\Delta W_{LT}$ is a coma aberration amount occurring at a time of tilting the plastic objective lens and $\Delta\theta$ is a lens tilt amount at that time,
wherein, in the case where the lens tilt sensitivity sensed by the lens tilt sensitivity sensing unit is equal to or larger than a predetermined value, lens tilt correction is performed by tilting the plastic objective lens so that a quality of a signal detected by the light detector is improved, and in the case where the lens tilt sensitivity sensed by the lens tilt sensitivity sensing unit is smaller than the predetermined value, the lens tilt correction is not performed.

2. The optical pickup according to claim 1, wherein the plastic objective lens is mounted so that an optical axis of the light beam that is guided by an optic system that guides the light beam emitted from the light source to the plastic objective lens and is incident to the plastic objective lens is aligned with an optical axis of the plastic objective lens.

3. The optical pickup according to claim 2, wherein, the plastic objective lens includes a range in which the lens tilt sensitivity $\Delta W_{LT}/\Delta\theta$ satisfies $|\Delta W_{LT}/\Delta\theta|<0.029$ in a use environment temperature range of the optical pickup.

4. The optical pickup according to claim 1 or 3, further comprising a temperature detecting unit to detect a circumferential temperature of the plastic objective lens, wherein the lens tilt sensitivity sensing unit determines based on a relationship of the lens tilt sensitivity to the temperature whether or not to have the predetermined lens tilt sensitivity.

5. The optical pickup according to claim 1 or 3, further comprising:
a collimator lens driving unit to change incidence magnification of the light beam incident to the plastic objective lens by driving a collimator lens that is installed in the optic system to convert a dispersion angle of the light beam emitted from the light source in the optical axial direction; and
a position detecting unit to detect a position of the collimator lens,
wherein the lens tilt sensitivity sensing unit determines, based on a relationship of the incidence magnification of the light beam incident to the plastic objective lens to the position of the collimator lens and a relationship of the lens tilt sensitivity to the incidence magnification, whether or not to have the predetermined lens tilt sensitivity.

6. The optical pickup according to claim 5, wherein in the case where the optical disc is a multi-layer optical disc having a plurality of recording layers, the lens tilt sensitivity sensing unit determines, based on a relationship of the lens tilt sensitivity to the incidence magnification of the light beam incident to the plastic objective lens with respect to each recording layer, whether or not to have the predetermined lens tilt sensitivity.

7. The optical pickup according to claim 1 or 3, wherein the lens tilt sensitivity sensing unit determines, based on a change in jitter sensed at the time of applying a tilt wobbling operation to the objective lens, whether or not to have the predetermined lens tilt sensitivity.

8. The optical pickup according to claim 1 or 3, wherein the lens tilt sensitivity sensing unit determines, based on a change in RF signal sensed at the time of applying a tilt wobbling operation to the objective lens, whether or not to have the predetermined lens tilt sensitivity.

9. An optical disc apparatus having an optical pickup that records and/or reproduces information signals by irradiating a light beam on an optical disc that is driven to rotate,
wherein the optical pickup includes:
a light source to emit the light beam having a predetermined wavelength;
a plastic objective lens to condense the light beam emitted from the light source on an optical disc;
a light detector to receive the light beam reflected by the optical disc and detects the reflected light beam;

an objective lens driving unit to drive the plastic objective lens in a tilt direction to tilt the plastic objective lens; and a lens tilt sensitivity sensing unit to sense a lens tilt sensitivity that is denoted by $\Delta W_{LT}/\Delta\theta$, in which $\Delta W_{LT}$ is a coma aberration amount occurring at a time of tilting the plastic objective lens and $\Delta\theta$ is a lens tilt amount at that time, and wherein, in the case where the lens tilt sensitivity sensed by the lens tilt sensitivity sensing unit is equal to or larger than a predetermined value, lens tilt correction is performed by tilting the plastic objective lens so that a quality of a signal detected by the light detector is improved, and in the case where the lens tilt sensitivity sensed by the lens tilt sensitivity sensing unit is smaller than the predetermined value, the lens tilt correction is not performed.

* * * * *